United States Patent
Nakashima et al.

(10) Patent No.: US 8,326,028 B2
(45) Date of Patent: Dec. 4, 2012

(54) DROPOUT COLOR PROCESSING METHOD AND PROCESSING APPARATUS USING SAME

(75) Inventors: Keisuke Nakashima, Hitachi (JP); Shinichi Shinoda, Hitachi (JP); Hiroshi Shojima, Hitachiota (JP); Masahiro Oikawa, Minamiashigara (JP); Kazuki Nakashima, Atsugi (JP); Yasuhiro Uchida, Odawara (JP)

(73) Assignee: Hitachi Computer Peripherals Co., Ltd., Kanagawa (JP)

( * ) Notice: Subject to any disclaimer, the term of this patent is extended or adjusted under 35 U.S.C. 154(b) by 1015 days.

(21) Appl. No.: 12/342,627

(22) Filed: Dec. 23, 2008

(65) Prior Publication Data

US 2009/0214109 A1     Aug. 27, 2009

(30) Foreign Application Priority Data

Dec. 26, 2007 (JP) ................. 2007-333427
Jun. 20, 2008 (JP) ................. 2008-161540

(51) Int. Cl.
    *G06K 9/00* (2006.01)
(52) U.S. Cl. .................................. 382/163
(58) Field of Classification Search ........... 382/162–167
    See application file for complete search history.

(56) References Cited

U.S. PATENT DOCUMENTS

| | | | |
|---|---|---|---|
| 5,841,899 A * | 11/1998 | Ide et al. | 382/168 |
| 5,859,712 A | 1/1999 | Kim | |
| 6,757,426 B2 * | 6/2004 | Link et al. | 382/163 |
| 7,020,328 B2 * | 3/2006 | Barton | 382/163 |
| 7,729,534 B2 | 6/2010 | Maeda | |
| 2002/0037102 A1 * | 3/2002 | Toda | 382/168 |
| 2003/0210411 A1 * | 11/2003 | Sawada | 358/1.9 |
| 2005/0190968 A1 * | 9/2005 | Kanai et al. | 382/169 |
| 2006/0269125 A1 * | 11/2006 | Kalevo et al. | 382/162 |
| 2007/0154091 A1 * | 7/2007 | Toda | 382/172 |
| 2010/0165141 A1 * | 7/2010 | Silverbrook et al. | 348/222.1 |

FOREIGN PATENT DOCUMENTS

| | | |
|---|---|---|
| JP | 06-203204 | 7/1994 |
| JP | 07-098762 | 4/1995 |
| JP | 09-051443 | 2/1997 |
| JP | 9-270898 | 10/1997 |
| JP | 10-042157 | 2/1998 |
| JP | 11-272864 | 10/1999 |
| JP | 2000-315256 | 11/2000 |
| JP | 2001-118031 | 4/2001 |

(Continued)

OTHER PUBLICATIONS http://supportadobe.co.jp/faq/faq/qadoc.sv?227786+002.

*Primary Examiner* — Jingge WU
(74) *Attorney, Agent, or Firm* — Antonelli, Terry, Stout & Kraus, LLP.

(57) ABSTRACT

It is possible to compatibly set multiple "dropout" color ranges and "non-dropout" color ranges and uniquely determine a dropout boundary. An object of the present invention is to greatly conserve maintenance cost of adding a new dropout form after apparatus operations. A conventional technology aims at assuring relation to a predetermined color region, determining the presence or absence of contention, or uniquely settling a dropout boundary. The present invention provides a means for supplying levels to a "dropout" color range and a "non-dropout" color range. A registered color range histogram can be quasi-three-dimensionally visualized so that an operator can make adjustment by viewing a contention determination result and an image.

2 Claims, 35 Drawing Sheets

FOREIGN PATENT DOCUMENTS

| | | |
|---|---|---|
| JP | 2002-279420 | 9/2002 |
| JP | 2003-216894 | 7/2003 |
| JP | 2004-135269 | 4/2004 |
| JP | 2004-235768 | 8/2004 |
| JP | 2005-071134 | 3/2005 |
| JP | 2005-150837 | 6/2005 |
| JP | 2005-258683 | 9/2005 |
| JP | 2005-267480 | 9/2005 |

* cited by examiner 300 dpi 200 dpi

FIG. 15A

| # | MODE NAME | BR ARRANGE | BOUNDARY NAME |
|---|---|---|---|
| 1 | A-1 | DN01-1-100-50+DN01-0-60-99+DN08-0-200-5 | A-1.bou |
| 2 | B-2 | DN01-0-60-99 | B-2.bou |
| 3 | A-2 | DN01-1-100-50+DN01-0-60-99 | A-2.bou |

FIG. 15B

| # | FORM NAME | DO AVAILABILITY | HI NAME | COLOR RANGE | LEVEL | BR NAME |
|---|---|---|---|---|---|---|
| 1 | DN01 | 1 | .h1 | 100 | 50 | DN01-1-100-50 |
| 2 | AP02 | 1 | .h2 | 30 | 80 | .AP02-1-30-80 |
| 3 | DN01 | 0 | .h1 | 60 | 99 | DN01-0-60-99 |
| 4 | DN08 | 0 | .h1 | 200 | 5 | DN08-0-200-5 |

FIG. 21A
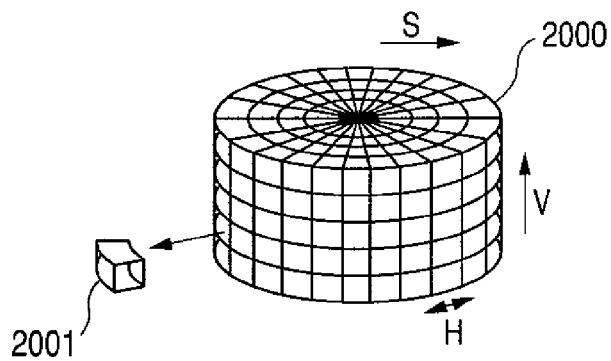
FIG. 21B
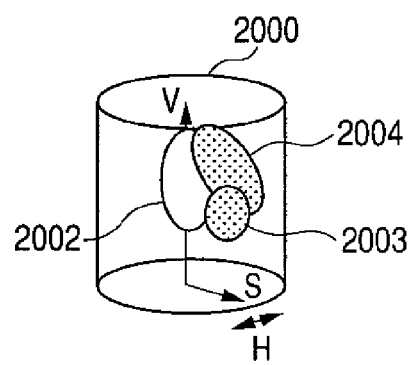
FIG. 22
| | H=0 | S=0 | S=0 | ... | S=30 | S=31 |
|---|---|---|---|---|---|---|
| | V=0 | 1235 | 300 | 0 | 2 | 9 |
| | V=1 | 500 | 52 | 0 | 5 | 8 |
| | ... | 0 | 0 | 0 | 0 | 0 |
| | V=30 | 2500 | 658 | 0 | 25 | 0 |
| | V=31 | 5862 | 1250 | 0 | 0 | 0 |

DROPOUT COLOR PROCESSING METHOD AND PROCESSING APPARATUS USING SAME

CLAIM OF PRIORITY

The present application claims priority from Japanese Patent Application No. 2007-333427 filed on Dec. 26, 2007, and Japanese Patent Application No. 2008-161540 filed on Jun. 20, 2008, the content of which are hereby incorporated by reference into this application.

BACKGROUND OF THE INVENTION

1. Field of the Invention

The present invention relates to "dropout" image processing that specifies a color range for documents such as forms containing multicolor image data and changes a given color to a predetermined color.

2. Description of the Related Art

The electronic document law came into force on Apr. 1, 2005, so as to legally permit electronically archiving finance documents in image file formats. An optical character reader (OCR) and a scanner are used to promote computerization of documents at offices, public offices, and self-governing bodies. Particularly, the OCR computerizes a large amount of handwritten information in a short period of time and greatly contributes to operational efficiency improvement.

An OCR form used for the OCR form uses a dropout color to print a frame or a ruled line used as a reference for a user to write characters and helps read only handwritten characters to improve a recognition rate. The conventional character recognition uses a filter attached to a read sensor of the OCR to optically extract characters and therefore is an OCR-specific function. The present character recognition computerizes a multicolor read image to digitally extract characters. However, companies or business places uniquely create, print, and use various OCR forms. The installation of an OCR requires specifying and storing a frame color to be dropped out depending on the working environment.

When enterprises or municipalities are integrated, there is a need to efficiently change OCR settings after installation of an OCR so as to promptly ensure compatibility with a wide variety of forms used for the enterprises or municipalities before the integration. The number of dropout colors increases (multiple dropout colors) to represent various information on a single form, necessitating the use of diverse character colors including color carbon copies. It seems to forecast an increasing demand for improving a function to configure a boundary (threshold value) for character color or extracted color.

To solve this problem, conventional technologies include the parameter setup screen proposed in JP-A No. 272864/1999, the method of specifying character color and character frame color described in JP-A No. 203204/1994, and the method of specifying a dropout range using an operation section described in JP-A No. 150837/2005.

The technology described in JP-A No. 135269/2004 extracts and averages an image region from an outline to improve accuracy of dropout determination. The technology described in JP-A No. 42157/1998 accurately corrects color shift. The technology described in JP-A No. 98762/1995 acquires an extraction distribution and an inhibition distribution and separates the extraction distribution from the inhibition distribution so that both do not overlap with each other.

To solve the above-mentioned problem, the other conventional technologies propose: changing a digitization threshold value in accordance with saturation as described in JP-A No. 118031/2001; finding maximum and minimum values of a color distribution and a dropout color range from the histogram for a specific image portion as described in JP-A No. 216894/2003; extracting a ruled line and improving separation accuracy based on the histogram of the ruled line as described in JP-A No. 258683/2005; and detecting a specific color region from the color distribution on a color space and removing a basic color as described in JP-A No. 51443/1997.

However, the methods described in JP-A No. 272864/1999 and JP-A No. 203204/1994 cannot store multiple dropout colors. The dropout color setting method described in JP-A No. 150837/2005 can store multiple dropout colors but may cause interference or contention. This is because the method cannot find relationship between the already stored color range and a color range to be stored.

The method described in JP-A No. 135269/2004 can improve the dropout accuracy for an achromatic region but cannot be used for numerous variations of forms. Eventually, an operator needs to specify colors. The method described in JP-A No. 42157/1998 can uniquely correct the color shift amount, making it difficult to ensure trade-off between the corrected image quality and the processing time.

The method described in JP-A No. 98762/1995 solves contention between the extraction distribution and the inhibition distribution but lacks a means for an operator to specify and manipulate a color region in the color space. The operator cannot acquire a satisfactory threshold boundary. Particularly, it is almost impossible to specify a character on a half-tone background.

The invention aims at solving a problem concerning semi-automatic generation of a dropout boundary by the aid of an operator. Conventionally, threshold values or parameters are adjusted for a dropout boundary on a customer basis. A newly added form contends with the already configured dropout range. Many man-hours were required to solve a problem that makes a previously legible character illegible. A careless boundary setting causes a legible character to be dropped out. The adjustment or customization requires high levels of skills based on experience and knowledge.

Increasing the number of setting threshold values makes it difficult to maintain a color to be read and degrades robustness. Changing a threshold boundary surface on the color space from flat to curved makes it difficult to uniquely determine where and how to adjust. The adjustment requires experiments using a sample.

The conventional techniques or a combination of the same complicates user operations for specifying a color to be extracted and requires many man-hours for adjusting the threshold value.

For example, the technique described in JP-A No. 118031/2001 varies a digitization threshold value depending on saturation and requires configuring a saturation threshold value for making distinction between a chromatic color and an achromatic color. The threshold value needs to be decreased so as to drop out a lowly saturated ruled line. No characters can be read from a form that contains a highly saturated character hand-written by a ballpoint pen. The technique described in JP-A No. 216894/2003 or JP-A No. 258683/2005 finds maximum and minimum values for the color distribution to define a color range. The technique uses a square range of colors to be extracted or dropped out. A ruled line appears when the extraction region is reduced to prevent a faint and patchy character. A character becomes faint and patchy when the extraction region is expanded to prevent a ruled line. The dilemma makes it very difficult to adjust the threshold value.

The technique described in JP-A No. 51443/1997 detects a specific color region from the color distribution in the color space and removes a basic color. The technique provides examples of applying various methods of extracting specific colors to a color plane. Since the extraction is specific to the color plane, the technology cannot be used for separation at a portion where a ruled line intersects with a character.

SUMMARY OF THE INVENTION

To solve the above-mentioned problem, the present invention provides a dropout color processing apparatus including: a means for inputting a document as multicolor image data; a means for specifying a dropout color range in the image data; a means for converting the image data inside the dropout color range into a predetermined color; a means for specifying a non-dropout color range in the image data; and a means for generating a dropout color boundary from the dropout color range and the non-dropout color range.

The dropout color processing apparatus according to the invention includes a means for specifying a dropout level and a means for specifying a non-dropout color range.

The dropout color processing apparatus according to the invention is compatible with multiple dropout color ranges and multiple non-dropout color ranges.

The dropout color processing apparatus according to the invention includes a means for notifying an operator of a contention that may occur between a specified dropout color range and an already stored non-dropout color range or between a specified non-dropout color range and an already stored dropout color range.

The dropout color processing apparatus according to the invention includes a means for specifying a histogram of targeted image data in a quasi-three-dimensionally displayed color space as a means for specifying a color range.

The dropout color processing apparatus according to the invention includes a means for specifying a histogram. The means divides a color space into meshes and displays a mesh in a color belonging to the corresponding color space when a histogram for a targeted image included in the mesh exceeds a predetermined display threshold value.

The dropout color processing apparatus according to the invention includes a means for extracting a color range by concatenating a mesh that is displayed on a histogram and is adjacent to a corresponding color in a specified color space.

The dropout color processing apparatus according to the invention includes a means for concatenating a mesh to extract a color range. The means extracts a color range so that the mesh as a solid shape is convexed outward.

The dropout color processing apparatus according to the invention includes a means for establishing a correspondence between a color specified on a histogram image and an already stored color range.

To solve the above-mentioned problem, the invention provides a dropout color processing apparatus including: a means for inputting a document as multicolor image data; a means for specifying a read condition of the image data; a means for dropping out and displaying the image data; a means for finding a read displacement of color information in accordance with the read condition of the image data; a means for correcting the read displacement; and a means for selecting a type of filter to be corrected from the read displacement.

There has been a problem of complicating user operations for specifying a color to be extracted and requiring many man-hours for adjusting the threshold value. To solve this problem, the invention provides a dropout color processing apparatus including: an input section that inputs a document as multicolor image data; a color space conversion section that converts the image data into a specified color space; a histogram creation section that creates a histogram of data in the color space; an outline creation section that creates an outline of data distribution based on the histogram; a threshold generation section that creates an extraction region in a color space based on the created outline; a specified color conversion section that converts a pixel of the image data into specified color depending on whether or not a result of converting a pixel of the image data into the color space belongs to an extraction region in the color space; and an output section that outputs a processed image. The threshold generation section is provided with multiple threshold generation sections that use different techniques to generate an extraction region in a color space. When the outline creation section creates an outline, the multiple threshold generation sections are accordingly selected depending on whether or not a coordinate in a color space is located in a predetermined region.

At least one of the multiple threshold generation sections selects a minimum boundary for histogram distribution and creates an extraction region. At least one of the multiple threshold generation sections selects a trough of histogram distribution and creates an extraction region.

The region predetermined in the color space has a boundary parallel or perpendicular to the color space.

The region predetermined in the color space has a boundary tilted against the color space.

There is provided a dropout color processing apparatus including: an input section that inputs a document as multicolor image data; a color space conversion section that converts the image data into a specified color space; a histogram creation section that creates a histogram of data in the color space; an outline creation section that creates an outline of data distribution based on the histogram; a threshold generation section that creates an extraction region in a color space based on the created outline; a specified color conversion section that converts a pixel of the image data into specified color depending on whether or not a result of converting a pixel of the image data into the color space belongs to an extraction region in the color space; an output section that outputs a processed image; a first range specification section that specifies an "extracted-color-inclusive" image area for the image data; a second range specification section that specifies an "extracted-color-exclusive" image area for the image data; a histogram creation section that extracts color space distribution in the "extracted-color-inclusive" image area and part or all of the "extracted-color-exclusive" image area; and a threshold generation section that generates a threshold value based on a result of the histogram extraction.

The dropout color processing apparatus includes a means for generating a threshold value for "extracted color." The means includes a first smoothing means, a second smoothing means, and a threshold generation section. The first smoothing means generates an extracted-color-inclusive enveloping surface as distribution in a color space where an "extracted-color-inclusive" image region is extracted. The second smoothing means generates an extracted-color-exclusive enveloping surface as distribution in a color space where an "extracted-color-exclusive" image region is extracted. The threshold generation section has a criterion of assuming an "extracted color" to be located at least inside an extracted-color-inclusive enveloping surface and outside an extracted-color-exclusive enveloping surface.

The threshold generation means includes a threshold generation section that generates a threshold value by selecting a minimum boundary for histogram distribution outside an "extracted-color-exclusive" region and generates a threshold value by selecting a histogram trough inside an "extracted-color-exclusive" region when creating an "extracted-color-inclusive" outline based on the histogram extraction result in a contention region inside an extracted-color-inclusive enveloping surface and inside an extracted-color-exclusive enveloping surface.

The present invention can compatibly set multiple "dropout" color ranges and "non-dropout" color ranges and uniquely determine a dropout boundary. It is possible to greatly conserve maintenance cost of adding a new dropout form after apparatus operations Filters can be selected based on cooperation between pixel shift correction and read mode. The correction time can be shortened even when image qualities are unchanged.

The invention can provide a technique of specifying dropout color ranges capable of fast responding to changes in customer specifications. That is, a boundary surface can be uniquely determined by specifying not only a "dropout" color range but also a "non-dropout" color range and their "levels." A history of past settings can be quasi-three-dimensionally displayed so as to list color spaces. Settings can be configured without contention with an already stored color region. The system can warn of a contention when applicable.

A branch as a set of associated pixels can be extracted by specifying a color space on a quasi three-dimensional display. It is possible to easily specify a dropout color even from a form containing a half tone or such color as excessively differing from ink color for printing.

Even when a contention occurs during color range setting, specifying a color space on quasi three-dimensional display can retrieve an original form used to generate a branch or a histogram as an associated color region. The color range or the level can be adjusted by viewing displayed images.

The dropout color processing apparatus according to the invention determines a given color range in multicolor image data and converts the color range into a specified color. The dropout color processing apparatus can easily configure multiple "extracted-color-inclusive" ranges and "extracted-color-exclusive" ranges and automatically determine an extraction boundary. It is possible to easily add a new extraction form, greatly conserve maintenance cost, and stably extract and eliminate colors.

BRIEF DESCRIPTION OF THE DRAWINGS

FIGS. 15A and 15B show a data management table for modes and branches;

FIGS. 21A and 21B are schematic diagrams showing an example of creating a histogram according to the second embodiment of the invention;

FIG. 22 is a schematic diagram showing histogram storage data according to the second embodiment of the invention;

DETAILED DESCRIPTION OF THE PREFERRED EMBODIMENTS

First Embodiment

Embodiments of the invention will be described with reference to overall configurations, example screen displays, and operational flows.

Figure 1:
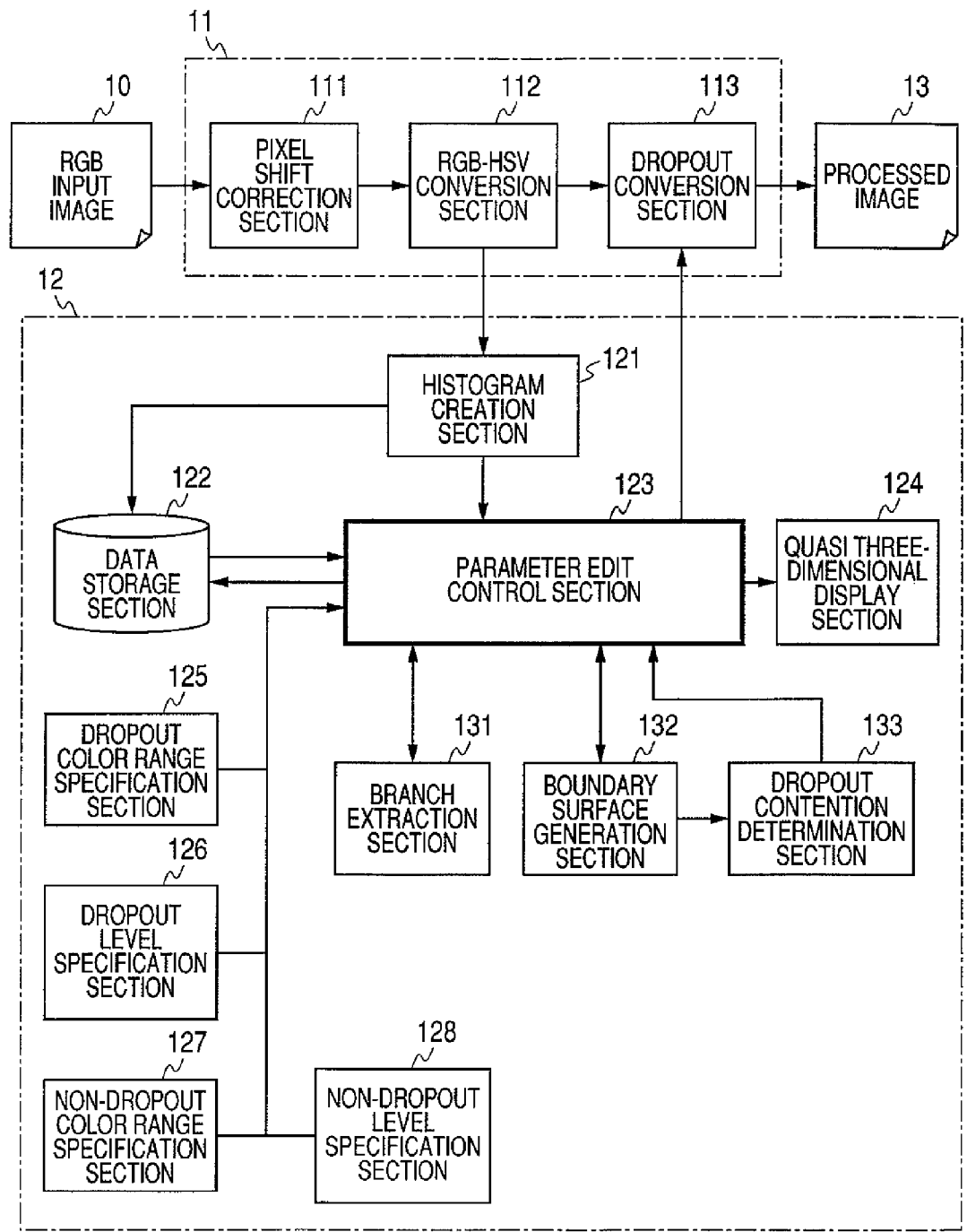
FIG. 1 is a block diagram showing an apparatus configuration according to the first embodiment of the invention.

FIG. 1 is a block diagram showing an apparatus configuration according to the first embodiment of the invention. A multicolor RGB input image 10 is input to a dropout processing section 11. The RGB input image 10 contains not only a character frame or a ruled line printed in dropout color on a form but also a character written on the form with reference to the character frame. In the dropout processing section 11, a pixel shift correction section 111 aligns color positions so as to correct pixel read positions for each color and read mode. An RGB-HSV conversion section 112 converts the input RGB image into an HSV equivalent. The color conversion streamlines color separation based on the saturation or the hue.

A dropout conversion section 113 then determines whether or not each pixel belongs to a predetermined dropout color range. When the pixel belongs to the color range, the pixel is changed to a predetermined color (white in many cases). This is called a dropout process. An object of the invention is to improve maintainability of the dropout color range during the dropout process.

The following describes configuration of a dropout editing section 12 that maintains the dropout color range. A histogram creation section 121 creates a histogram in accordance with the output from the RGB-HSV conversion section 112 using measurement units corresponding to H (hue), S (saturation), and V (value). A histogram result is stored in a data storage section 122 for reference and is supplied to a parameter edit control section 123. The parameter edit control section 123 controls parameter editing based on outputs from a dropout color range specification section 125, a dropout level specification section 126, a non-dropout color range specification section 127, and a non-dropout level specification section 128. The dropout color range specification section 125 specifies a range to be dropped out. The dropout level specification section 126 specifies a dropout level. The non-dropout color range specification section 127 specifies a range not to be dropped out. The non-dropout level specification section 128 specifies a non-dropout level.

A color range is specified for a display output from a quasi three-dimensional display section 124. A branch extraction section 131 is used to extract a branch, that is, a set of colors including a specified color. The parameter edit control section 123 combines the extracted branch with data stored in the data storage section 122 to configure a dropout color range. The dropout editing section 12 generates a boundary surface that maximizes allowable margins for the "dropout" color range and the "non-dropout" color range. When a margined boundary surface cannot be generated, the dropout editing section 12 notifies an operator of no margin.

Figure 2:
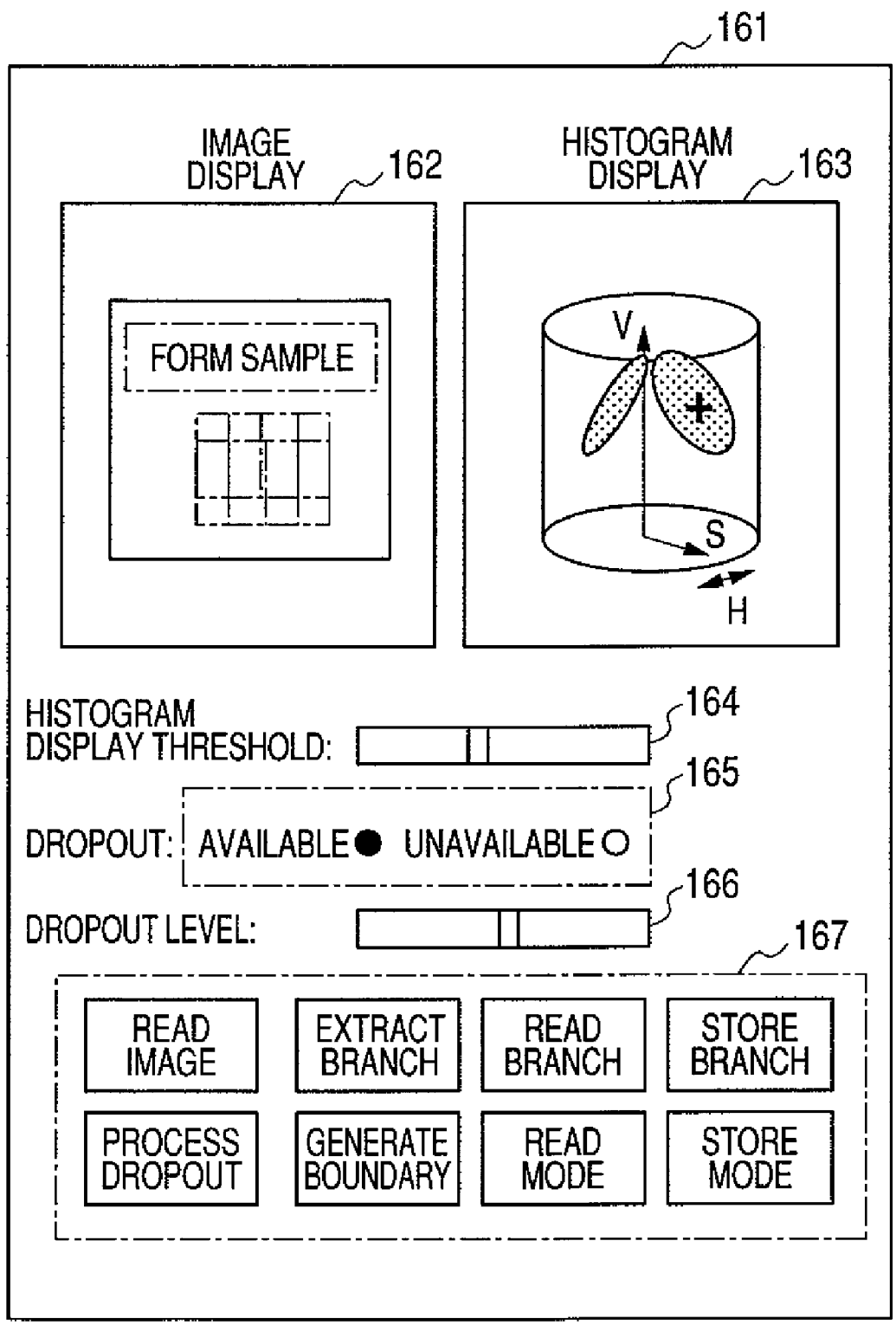
FIG. 2 is an example screen display according to the invention.

FIG. 2 shows an example screen display according to the invention. An operation button area 167 includes a "read image" button. Pressing the "read image" button displays a screen for selecting a targeted file. Specifying an intended image inputs the image. A display screen 161 displays the input image. A histogram display section 163 quasi-three-dimensionally displays a histogram as a result of HSV conversion of the input image. The histogram stores H, S, and V values. A histogram display threshold 164 specifies a threshold value for determining whether or not to display each of the H, S, and V values for the quasi-three-dimensionally displayed histogram.

Increasing a threshold value displays many areas. Increasing an threshold value limits areas to be displayed. Pressing an "extract branch" button in the operation button area 167 extracts a branch related to the color clicked on the histogram image. A dropout selection button 165 specifies whether or not the dropout is available. A dropout level 166 specifies the dropout level. Pressing a "store branch" button in the operation button area 167 stores the branch.

Pressing a "read branch" button in the operation button area 167 invokes the stored branch. After a set of branches is edited, pressing a "store mode" button in the operation button area 167 stores the mode. According to the invention, an operator can easily edit multiple dropout color ranges using an image.

Figure 3:
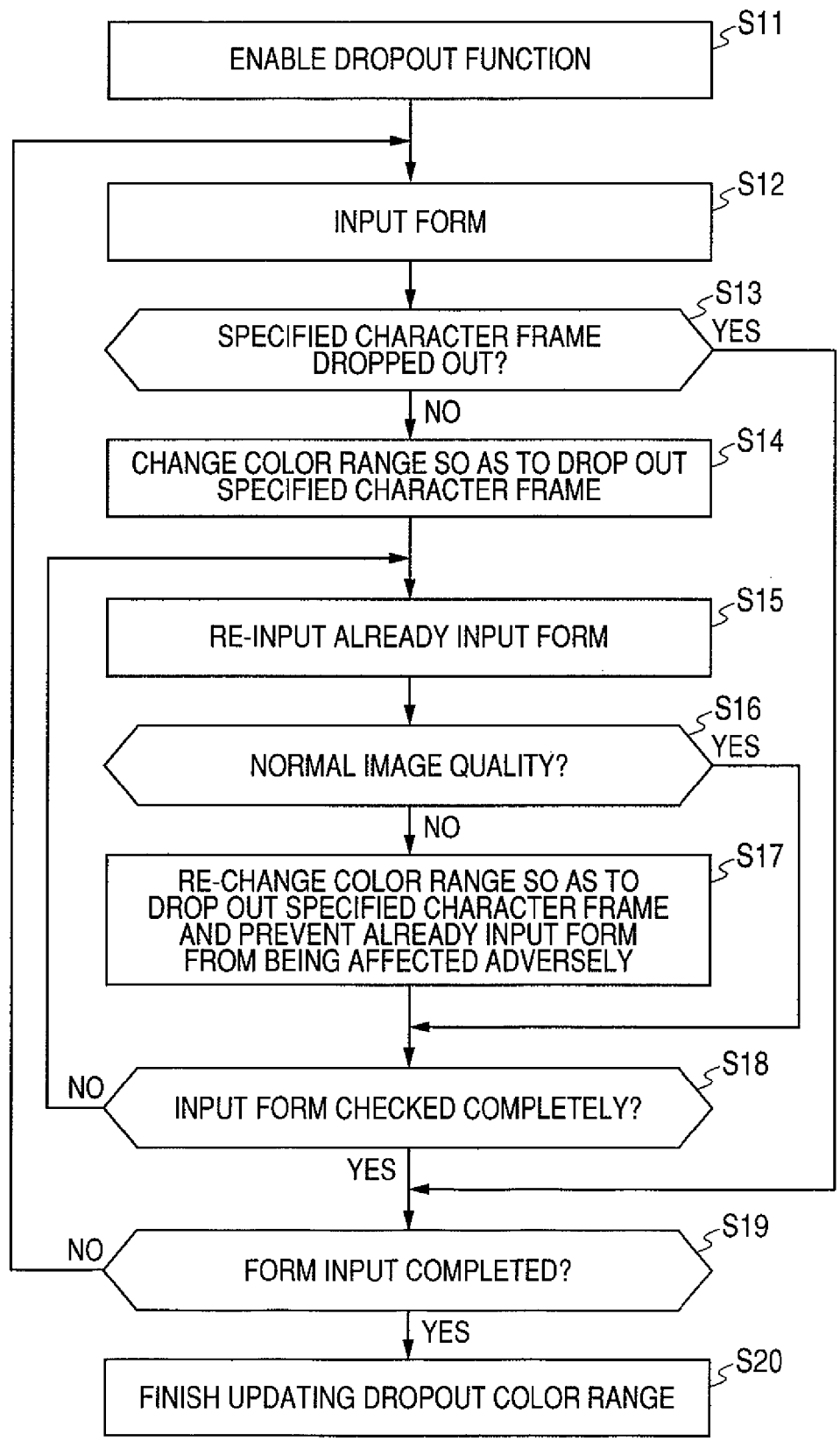
FIG. 3 is a flow chart of conventional dropout color range maintenance.

It is an object of the invention to edit the dropout color range. FIG. 3 shows a flow chart of conventional dropout color range maintenance so as to describe how the dropout color range has been edited so far. Detailed operations will be described later.

A dropout color range is preset and a dropout function of the processing system is enabled (S11). A form to be added is input (S12). The system checks whether or not a specified character frame is dropped out (S13). When the character form is dropped out, control proceeds to the next form. When the character form is not dropped out, the system changes the dropout color range to drop out the character frame (S14). The system then re-inputs the existing form used for setting the previous color range (S15) in order to check whether or not the change causes an adverse effect. The system determines whether or not the image quality degrades due to a faint and patchy character (S16). When the image quality does not degrade, the system checks another existing form (S18). When the image quality degrades, the system re-adjusts the dropout color range and restarts the check from the beginning. The conventional technology requires a large amount of man-hours, knowledge, and experience to determine a dropout color range that can read all the existing and new forms with satisfactory reproducibility.

Figure 4:
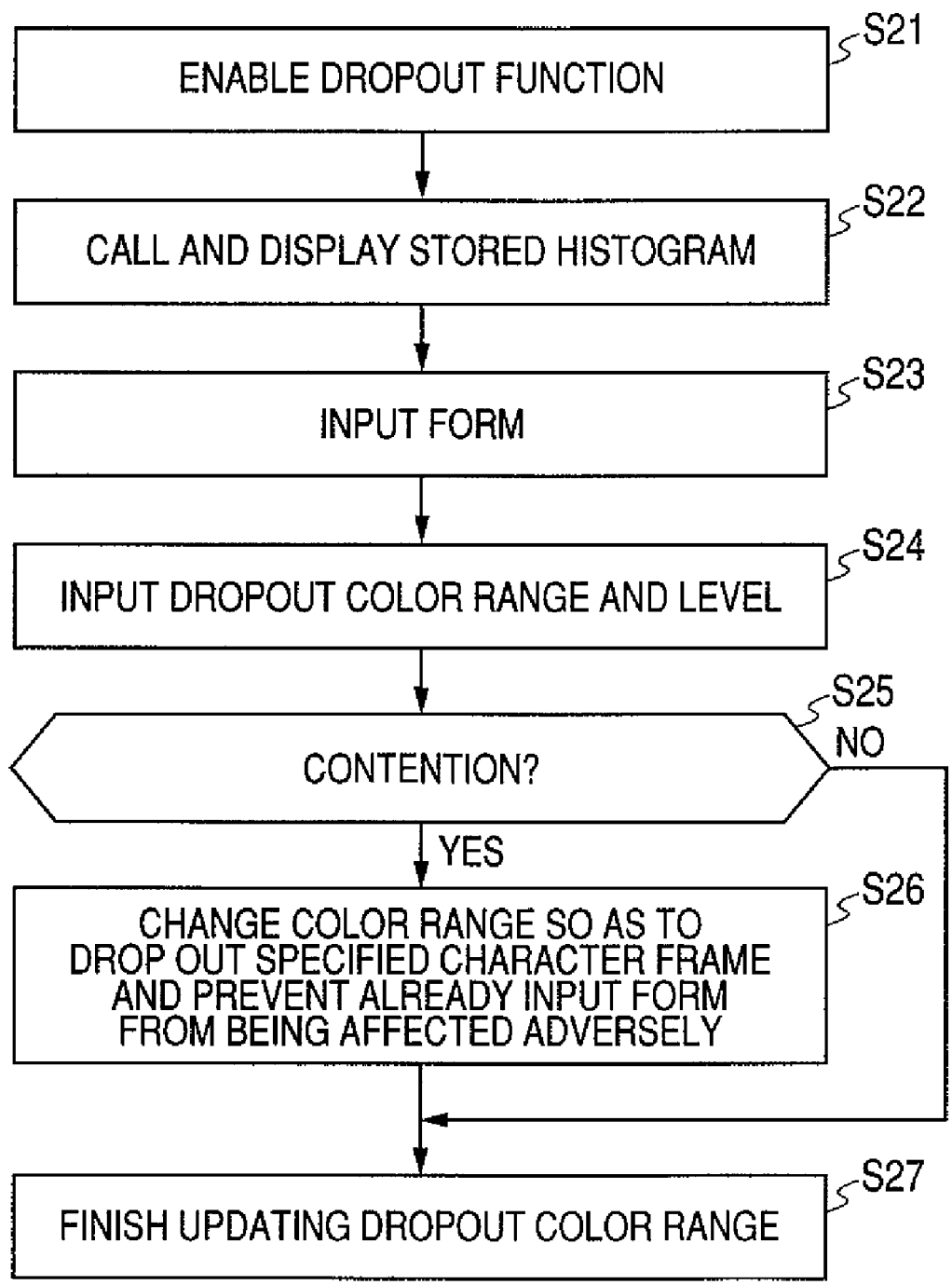
FIG. 4 is a flow chart of dropout color range maintenance according to the invention.

By contrast, FIG. 4 shows a flow chart of dropout color range maintenance according to the invention. Similarly to the conventional technology, a dropout color range is preset and a dropout function of the processing system is enabled (S21). The system then invokes and displays an already stored histogram (S22). A targeted form is then input (S23). The system is supplied with a color range to be dropped out and its level (S24). The system determines whether or not the input color range contends with the stored data (S25). For example, the "dropout" color range to be added may contend with the stored "non-dropout" character color range. In this case, the system drops out the specified character frame and changes the color range to another that does not adversely affect the existing input form.

This step shows a significant difference from the conventional technology. That is, the histogram display screen can display an already stored dropout or non-dropout color range. There is no need to re-check the existing form when the change process detects no contention. Consequently, only one change is needed. A complicated loop process is unnecessary as has been practiced so far.

The overview of the invention has been described. Details will be described below.

Figure 5A:
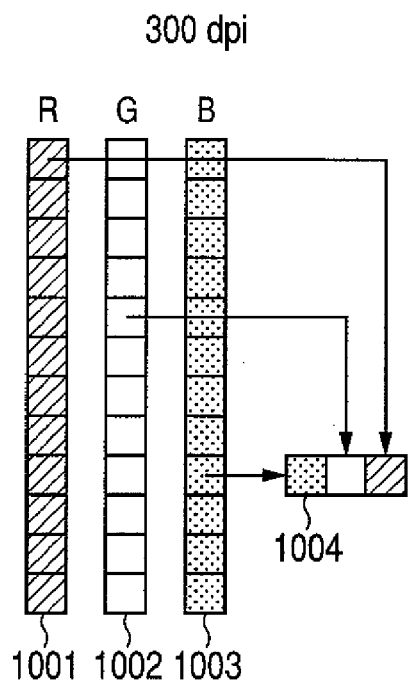
FIGS. 5A to 5D are conceptual diagrams showing color shift correction.
Figure 5B:
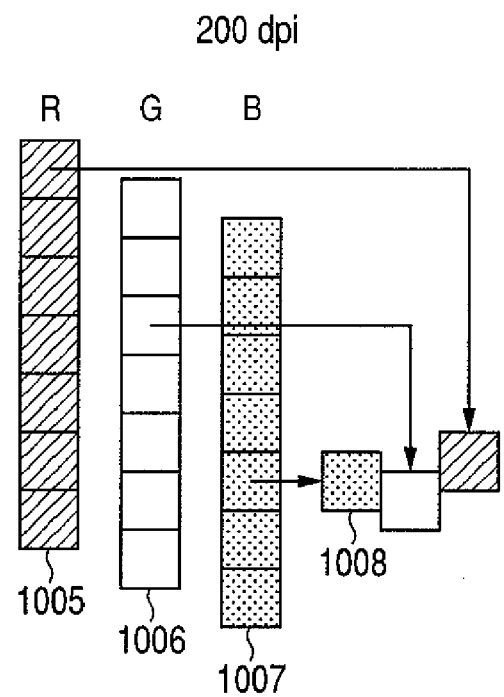
Figure 5C:
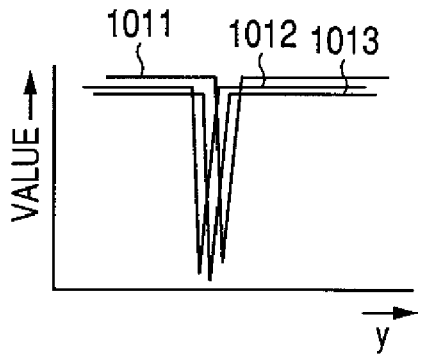
Figure 5D:
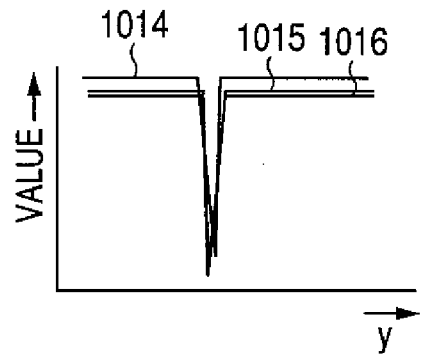

FIGS. 5A to 5D are conceptual diagrams showing color shift correction and illustrates the function of the pixel shift correction section 111. FIG. 5A shows how to align colors when multicolor data is read at 300 dpi resolution. The time elapses downward in the drawing. The R, G, and B sensors are physically different from each other. Due to read time differences, the R sensor (1001) uses data delayed eight lines and the G sensor (1002) uses data delayed four lines with reference to the B sensor (1003) to generate a synchronized image. FIG. 5B shows that the apparatus reads data at 200 dpi. Sub-lines are misaligned and need to be corrected when the number of delay lines differs from the integral multiple of a sensor displacement. FIG. 5C schematically shows value changes in the line direction before the correction. FIG. 5D schematically shows value changes in the line direction after the correction.

Figure 6A:
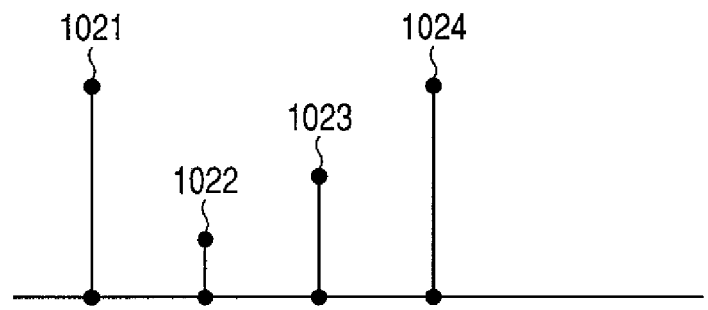
FIGS. 6A to 6C are conceptual diagrams showing a color shift correction method.
Figure 6B:
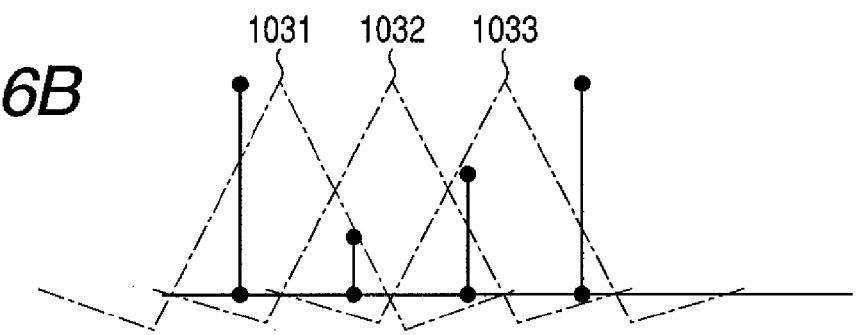
Figure 6C:
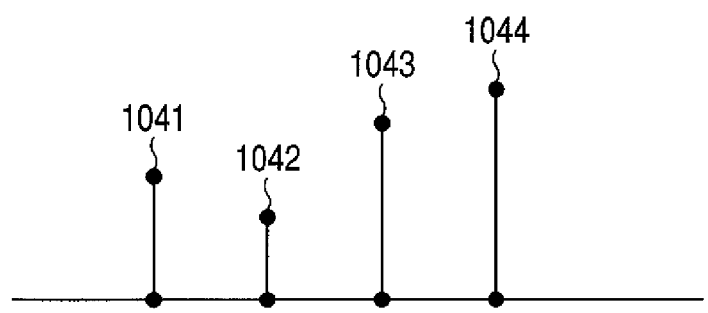

FIGS. 6A to 6C are conceptual diagrams showing a color shift correction method. FIG. 6A shows value changes of a pixel on a line basis. The pixel corresponds to a color to be corrected. Reference numeral 1021 represents a value that is assigned to a given pixel corresponding to a given color and is read on a given line. The value varies as indicated by reference numeral 1022 on the next line, 1023 on the next line, and so on. Such sensor acquires data on a line basis. To acquire data by advancing one third pixel phases, for example, a kernel interpolates pixels as indicated by reference numeral 1031 in FIG. 6B. The interpolated data is generated as shown in FIG. 6C.

Figure 7:
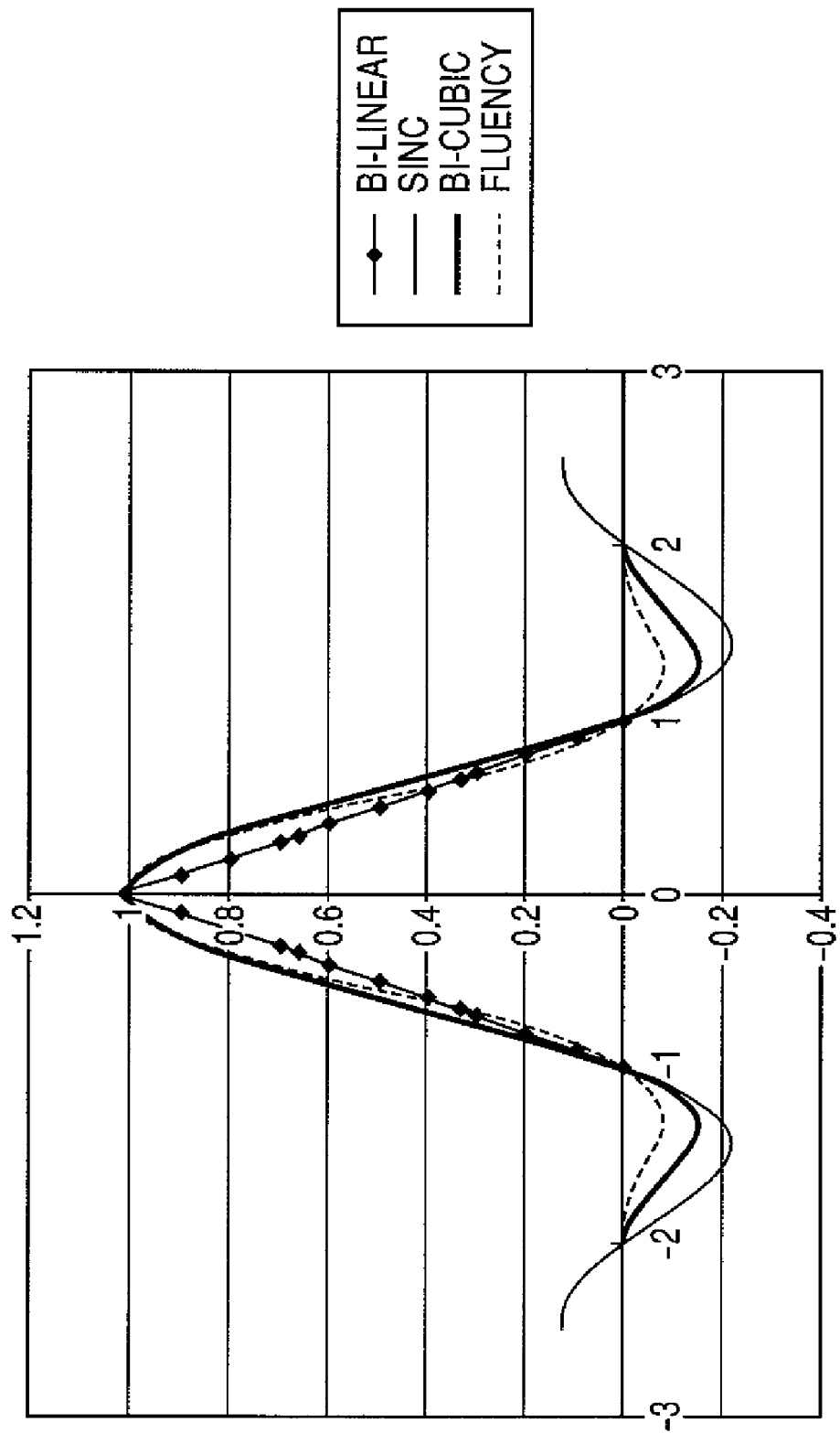
FIG. 7 shows an example interpolation kernel for color shift correction.

FIG. 7 shows an example interpolation kernel for color shift correction. A bi-linear interpolation provides linear interpolation based on a distance between adjacent pixels. The bi-linear interpolation features short processing time but causes a processed image unclear. By contrast, SINC function, bi-cubic or fluency function can be used to increase a kernel size and improve the image quality. The use of the kernel size as a parameter raises a problem of trade-off between the image quality after interpolation and the processing time.

Figure 8:
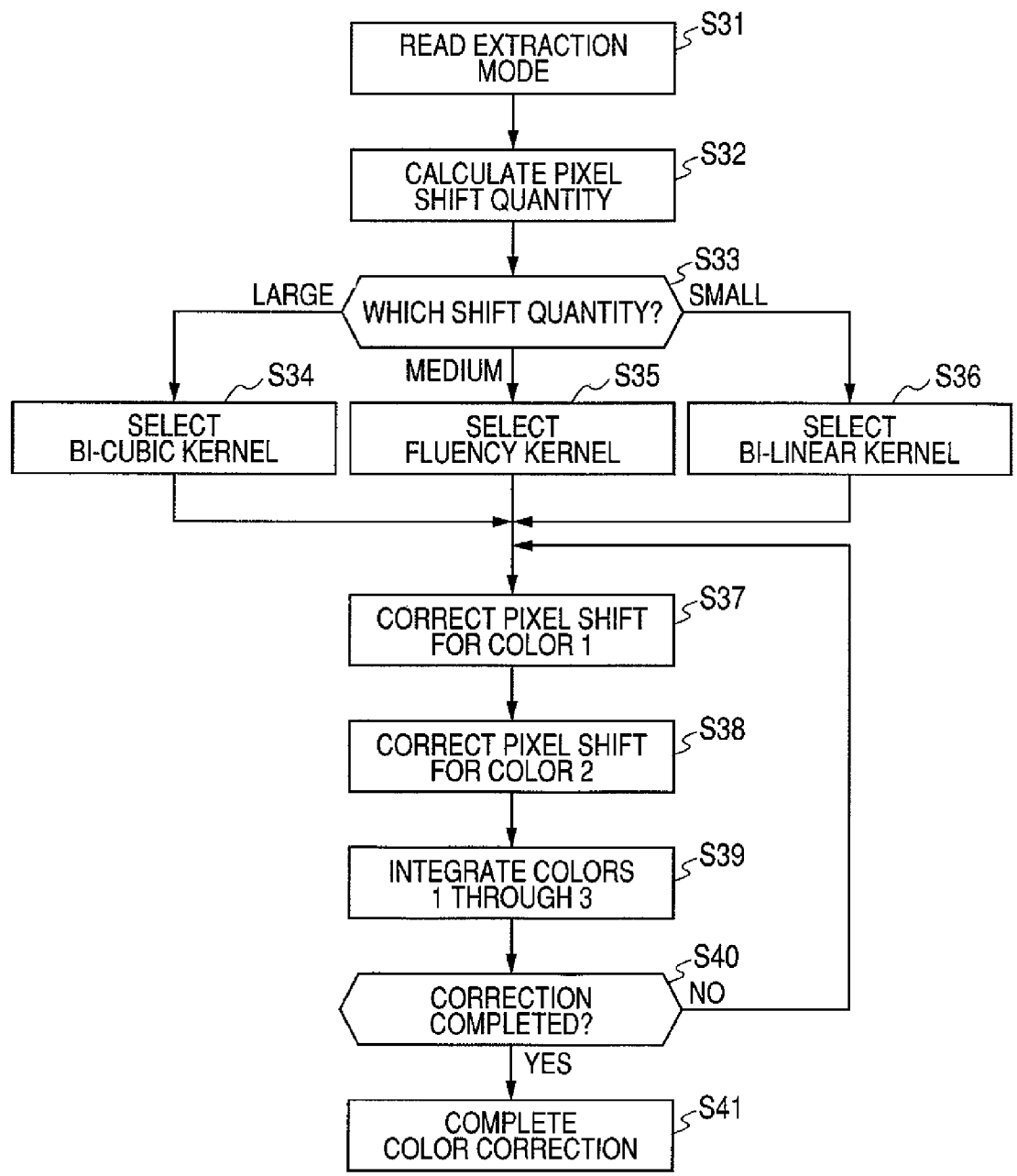
FIG. 8 is a flow chart of color shift correction according to the first embodiment of the invention.

FIG. 8 is a flow chart of a color shift correction process according to the invention. The process extracts read modes such as the number of read colors, read resolution, read image range, and read density (S31). The process calculates a pixel shift quantity when applicable (S32). Basically, the calculation is designed for color. When the read resolution is specified, simple conversion can be used to calculate the shift quantity. A large shift quantity is expected to further degrade the image quality and necessitates selecting bi-cubic for a large kernel size (S34). A medium shift quantity necessitates selecting fluency function (S35). A small shift quantity necessitates selecting bi-linear for a small kernel size (S36). The specified kernel is used to correct color 1 (S37) and color 2 (S38). The corrected colors are combined with the reference color to correct the color shift. It is possible to provide the process method that can balance the image quality after interpolation with the processing time.

Details of the RGB-HSV conversion section 112 and the dropout conversion section 113 are the same as those described in JP-A No. 272864/1999 and a detailed description is omitted for simplicity.

Figure 9A:
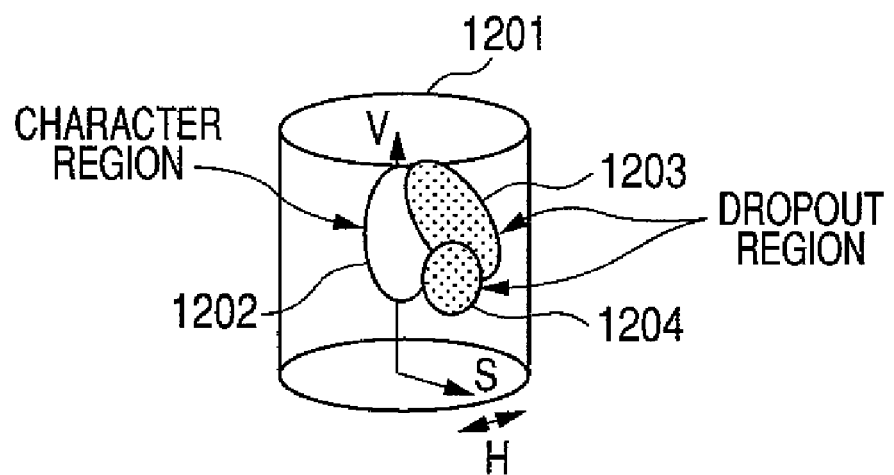
FIGS. 9A and 9B are conceptual diagrams illustrating display of a histogram.
Figure 9B:
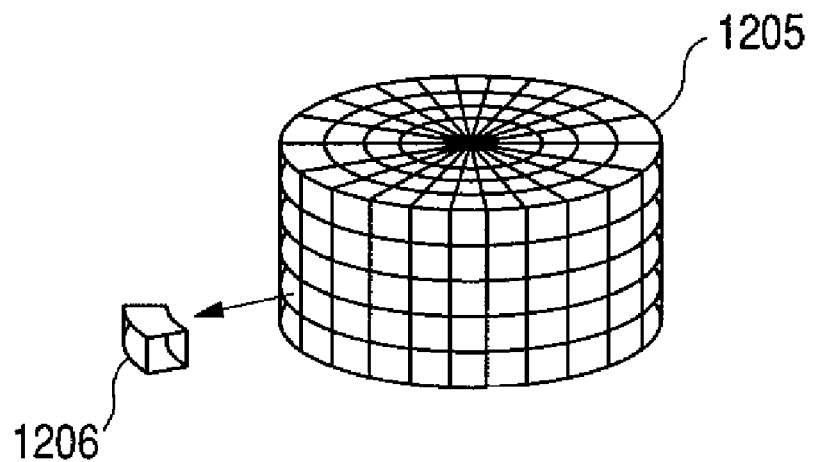

FIGS. 9A and 9B are conceptual diagrams illustrating display of a histogram on the histogram creation section 121. FIG. 9A quasi-three-dimensionally diagrams a character region 1202 and a dropout regions 1203 and 1204 in an HSV color space 1201. A rotation direction of a column represents H (hue). A distance from the axis represents S (saturation). A height direction represents V (value). Color display in the color space 1201 signifies that a histogram is calculated in units of meshes and exceeds a display threshold value. FIG. 9B shows an example of dividing the color space into meshes to provide histogram measurement units. Each mesh is a fan-shaped solid. Pixels of the input image are converted into HSV. The histogram is calculated in accordance with a position in the color space where the converted pixel is mapped.

Figure 10A:
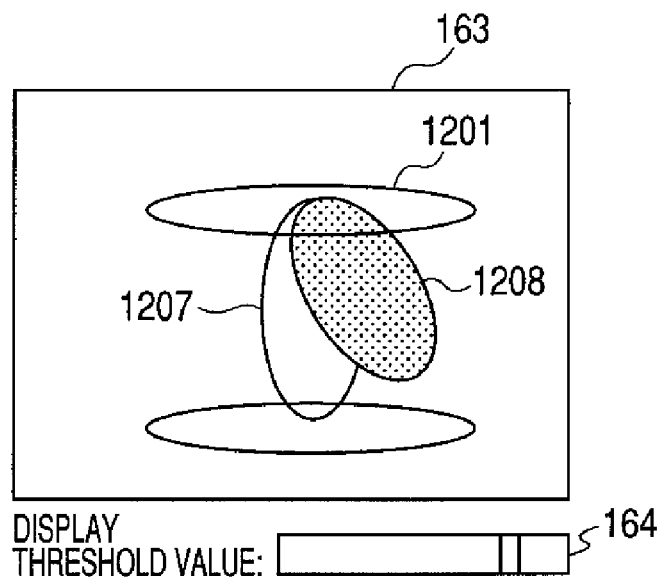
FIGS. 10A and 10B show example screens for displaying a histogram using display threshold values.
Figure 10B:
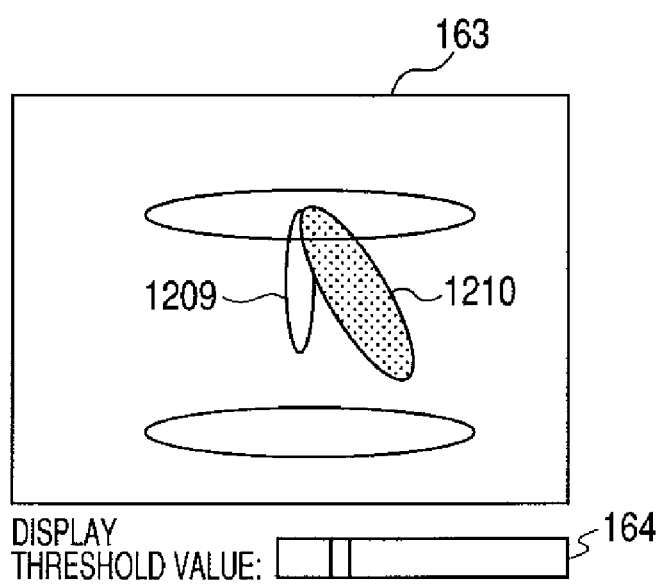

FIGS. 10A and 10B show example screens for displaying a histogram using display threshold values. Adjusting a display threshold dial 164 varies graphics displayed on the histogram screen. Decreasing the display threshold value widens the display range as shown in FIG. 10A. Increasing the display threshold value displays only frequent portions as shown in FIG. 10B. The display threshold value interlocks with threshold values for densities of a character to be reproduced and of a ruled line to be dropped out on a form image.

Figure 11A:
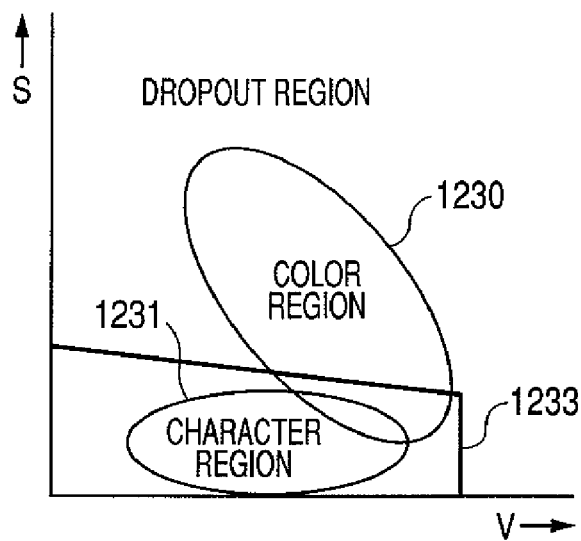
FIGS. 11A and 11B are conceptual diagrams illustrating a dropout boundary.
Figure 11B:
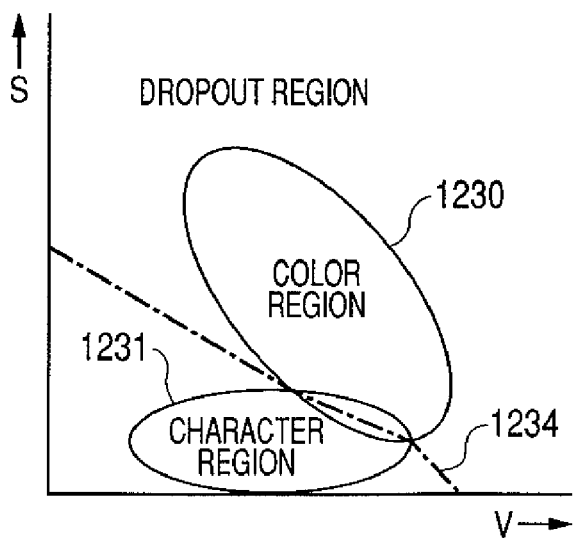

With reference to FIGS. 11A and 11B, a function of a boundary generation section 132 will be described. FIGS. 11A and 11B are conceptual diagrams illustrating a dropout boundary. FIG. 11A shows an example of slicing a plane formed by the value (V) and the saturation (S) at a given hue (H). A character region is defined as an area of low saturation (S) and low value (V). The other area is defined as a color region to be dropped out. The boundary can be defined as a boundary line 1233, for example. The boundary line does not cause a character to be faint but contains the color region. This signifies that part of the ruled line does not drop out. The invention has the advantage of estimating a dropout quantity using the histogram display without needing to routinely simulate image dropout.

The invention strictly defines the "non-dropout" character region and the "dropout" color region and specifies levels of the regions. Accordingly, a boundary line can be generated uniquely. FIG. 11B shows a conceptual diagram of a threshold boundary line. For simplicity, the example uses one character region and one dropout region. A unique boundary line 1234 forms a curved surface in the three-dimensional color space based on calculation of a point to generate a largest margin in consideration for levels of the "dropout" and "non-dropout" regions.

Figure 12A:
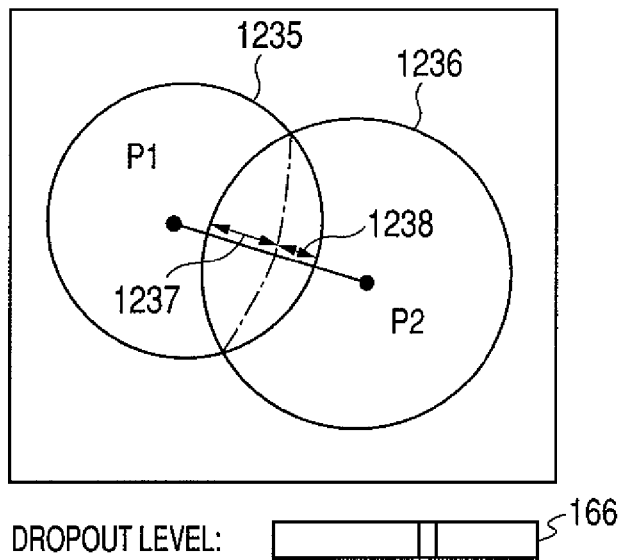
FIGS. 12A and 12B are conceptual diagrams illustrating determination of a dropout boundary.
Figure 12B:
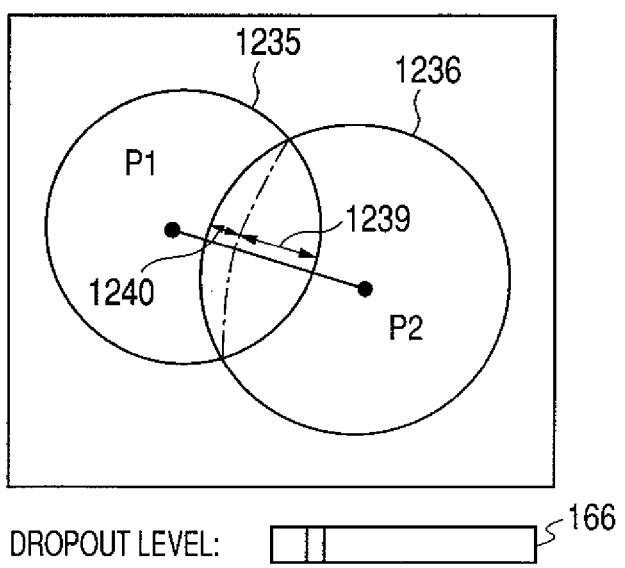

FIGS. 12A and 12B are conceptual diagrams illustrating determination of an embedded boundary surface. FIG. 12A shows boundary determination when the dropout levels are almost equal to each other. The boundary surfaces use their levels to accordingly form a unique boundary surface. It is equivalent to a boundary surface formed by combining two rubber balls with internal pressures specified. The boundary surface can be easily formed by dividing the combined regions by the ratio of the specified "levels." FIG. 12B shows that the dropout level of a color boundary 1236 is greater than that of a color boundary 1235. A dropout level adjustment dial 166 can be used to easily adjust the dropout level and the boundary surface. A dropout image can be also displayed in accordance with the adjustment.

Figure 13A:
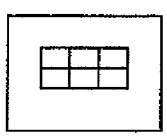
FIGS. 13A to 13G are conceptual diagrams illustrating branch edit.
Figure 13B:
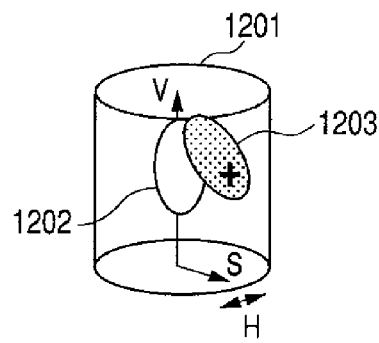
Figure 13C:
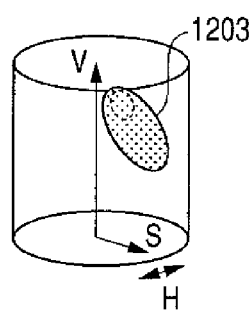
Figure 13D:
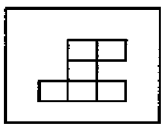
Figure 13E:
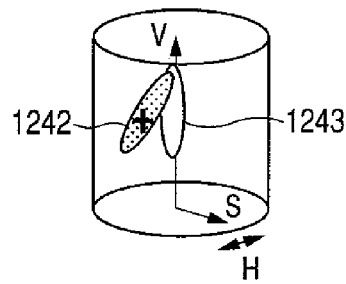
Figure 13F:
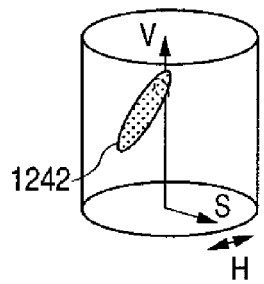
Figure 13G:
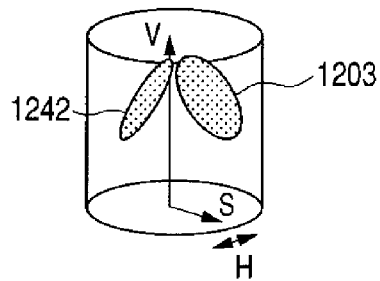

FIGS. 13A to 13G are conceptual diagrams illustrating branch edit and is used to explain a function of the parameter edit control section. The parameter edit control section reads a form shown in FIG. 13A and displays an example histogram as shown in FIG. 13B. A region 1203 to be dropped out is specified on the screen to extract a branch. FIG. 13C shows the extracted branch as an associated color set. Similarly, the parameter edit control section reads a form shown in FIG. 13D and displays a histogram as shown in FIG. 13E. A specified branch can be extracted as mentioned above as shown in FIG. 13F. The extracted branches are stored as shown in FIG. 13G and can be invoked on a mode edit screen. The branches can be used to easily create various combinations of dropout color boundaries.

Figure 14:
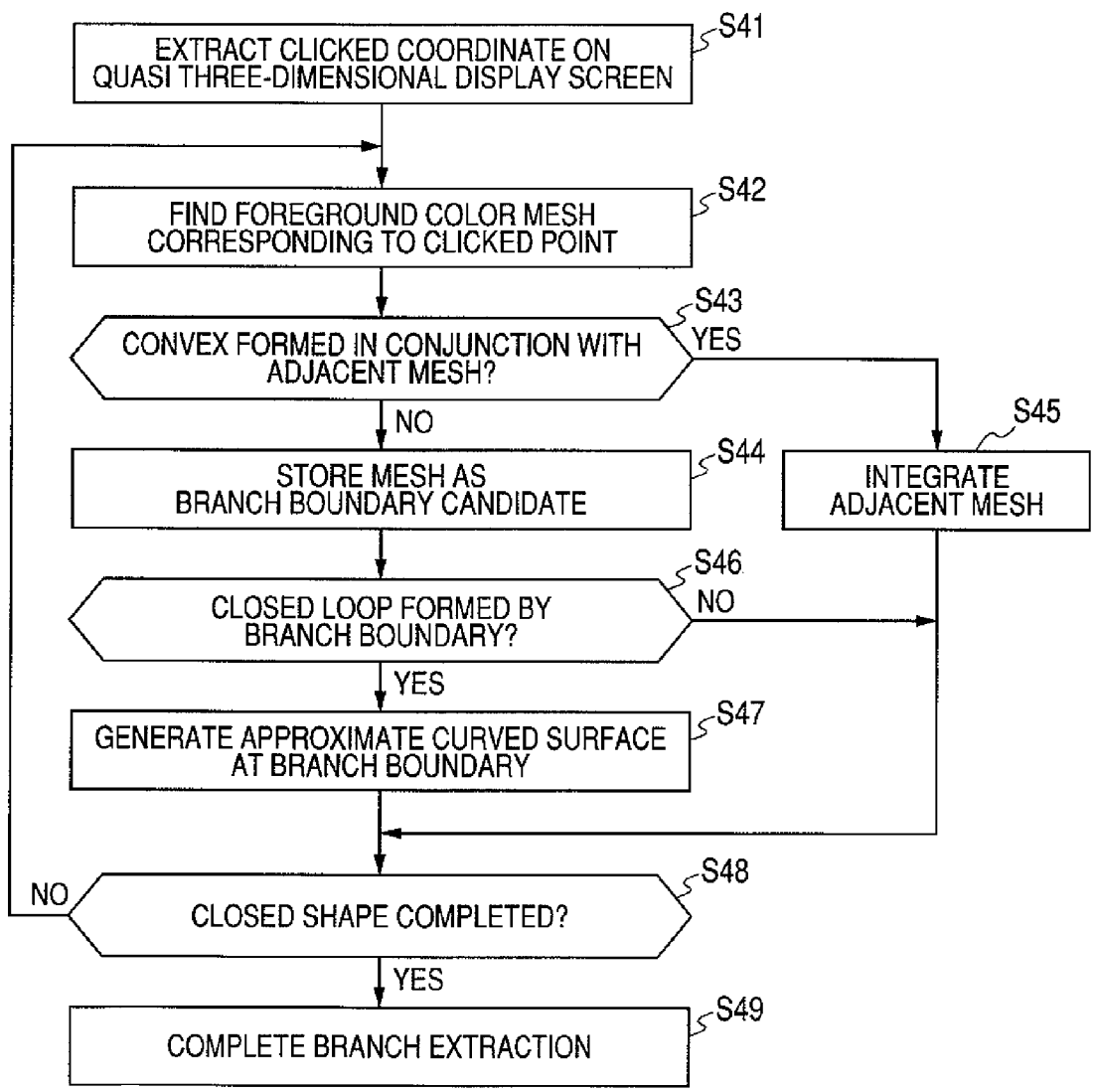
FIG. 14 is a flow chart showing branch extraction.

FIG. 14 is a flow chart showing branch extraction the branch extraction section 131 performs. A branch extraction process starts after an operator presses a branch extraction button and clicks on a quasi three dimension display screen. The process extracts the coordinate clicked on the quasi three dimension display screen (S41). The process finds the foreground displayed color mesh corresponding to the clicked point (S42). Based on the mesh position, the process checks whether or not the mesh is convex in conjunction with the adjacent mesh (S43). When the mesh is convex, the process integrates it with the adjacent mesh (S45). When the mesh is not convex, the process stores a branch boundary candidate (S44). The process determines whether or not the stored branch boundary forms a closed loop (S46). When a closed loop is formed, a cut-out surface for the branch is ensured. The process then generates an approximate curved surface (S47). The process proceeds for the adjacent mesh and determines whether or not a closed solid is formed (S48). When the determination is affirmed, the process completes the branch extraction (S49).

FIGS. 15A and 15B show example data to be stored in the data storage section 122. FIG. 15A shows a mode table for managing a set of branches. The data storage section 122 stores a set of branches corresponding to mode names so as to link with file names for the generated boundary surfaces. FIG. 15B shows a branch management table. The table stores the name of a form for creating the branch, dropout availability, the name of a histogram file created from the form, and the color range and the level used to extract the branch. Since the form is associated with the histogram, branch, and mode, the histogram can be used to adjust the boundary by confirming the faint and patchy condition of a specific character on the associated form.

The "dropout" region and the "non-dropout" region may contend or interfere with each other when the branch is stored, the mode is edited, or the boundary surface is adjusted. An operator is warned of such event so as to decrease mistakes.

Figure 16:
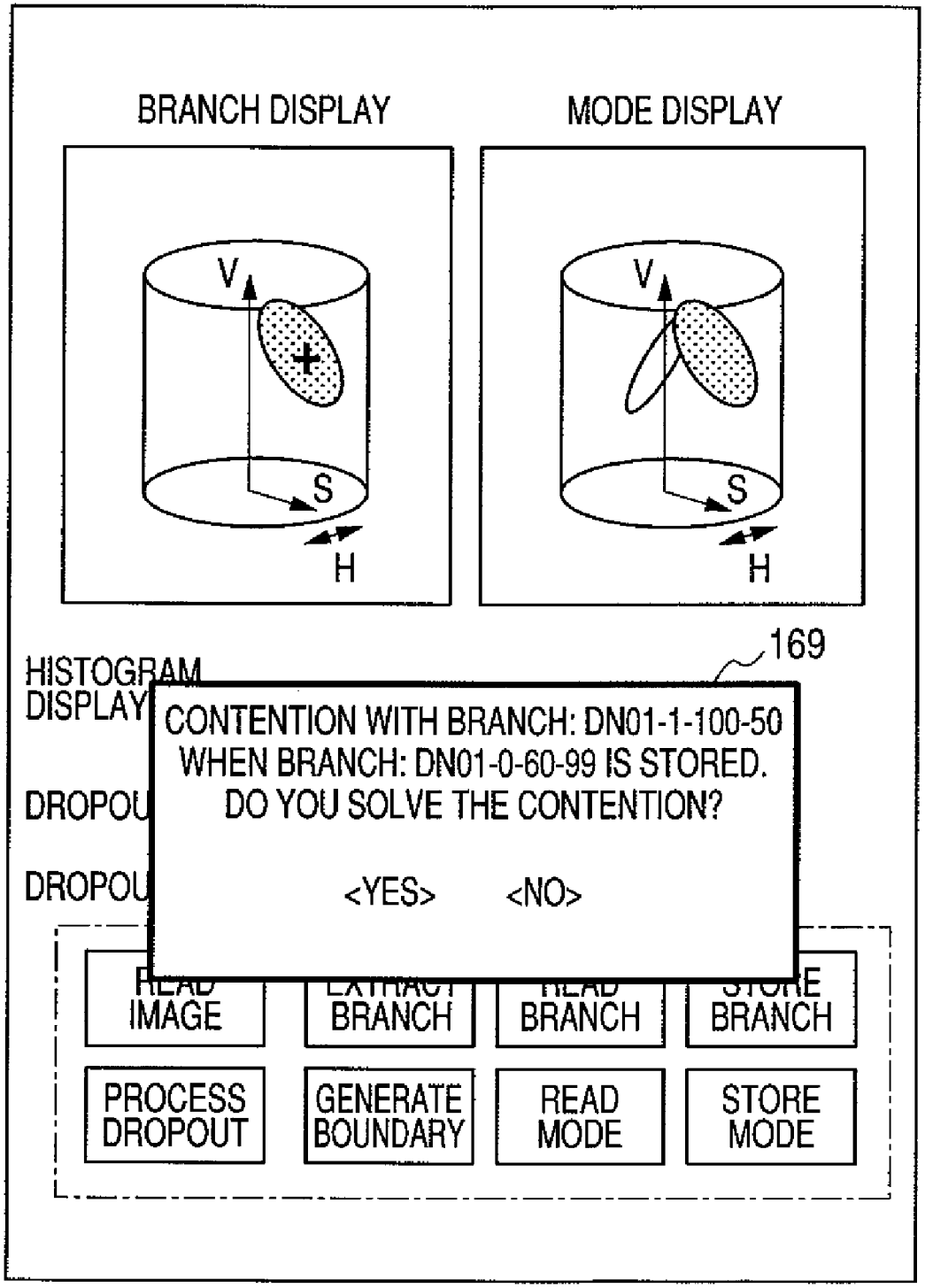
FIG. 16 shows an example alert given to an operator.

FIG. 16 shows a display screen that notifies a system operator of a warning. Using a warning message 169, the operator can confirm branches that contend due to the editing. The adjustment can be streamlined.

Figure 17:
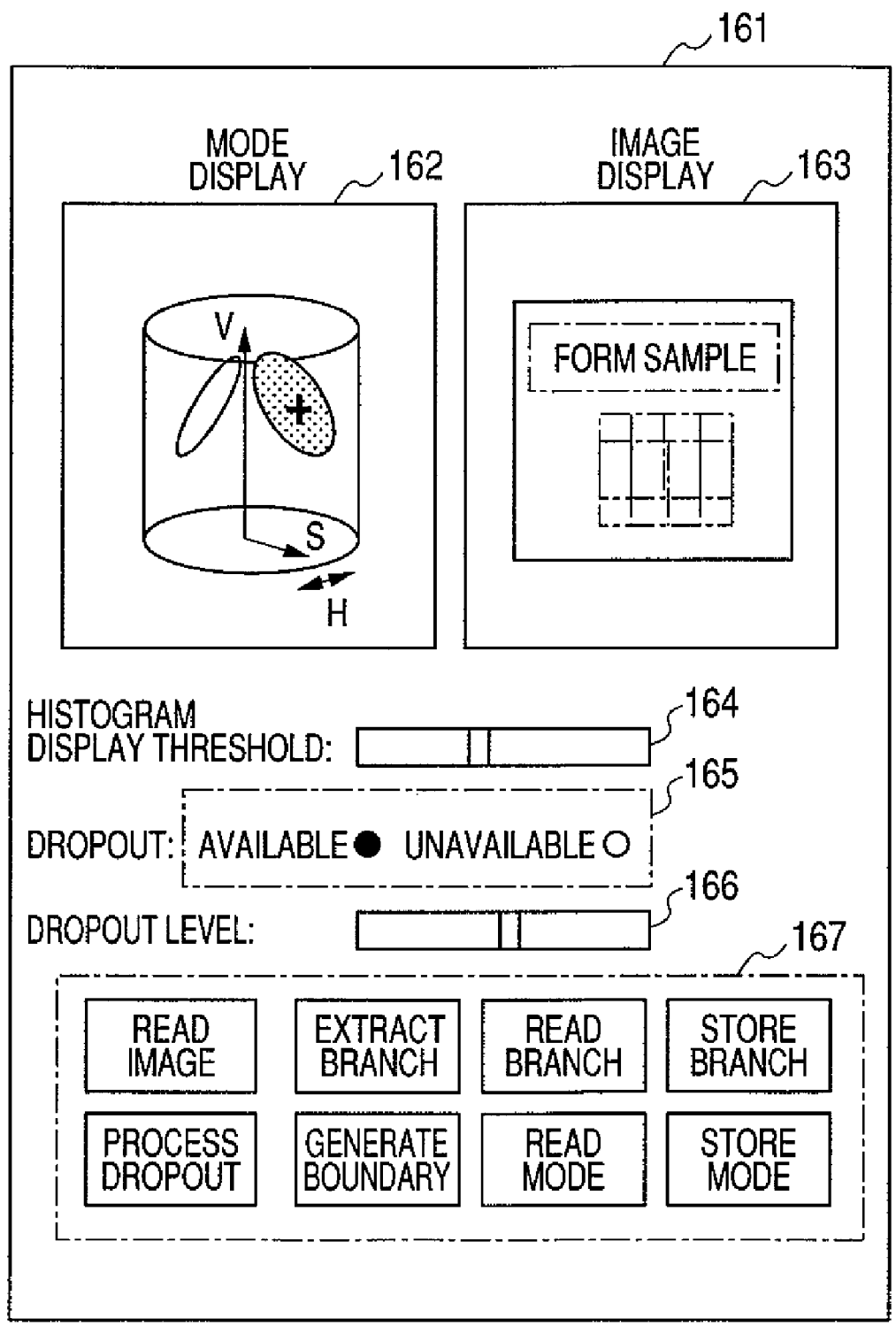
FIG. 17 shows an example screen that displays an image retrieved from the histogram.

FIG. 17 shows an example display screen used to search the histogram for an image during editing on the parameter edit control section. The operator needs to confirm an image while adjusting the color range on the histogram. The operator can confirm how the image varies while changing the branch level or the color range.

Figure 18:
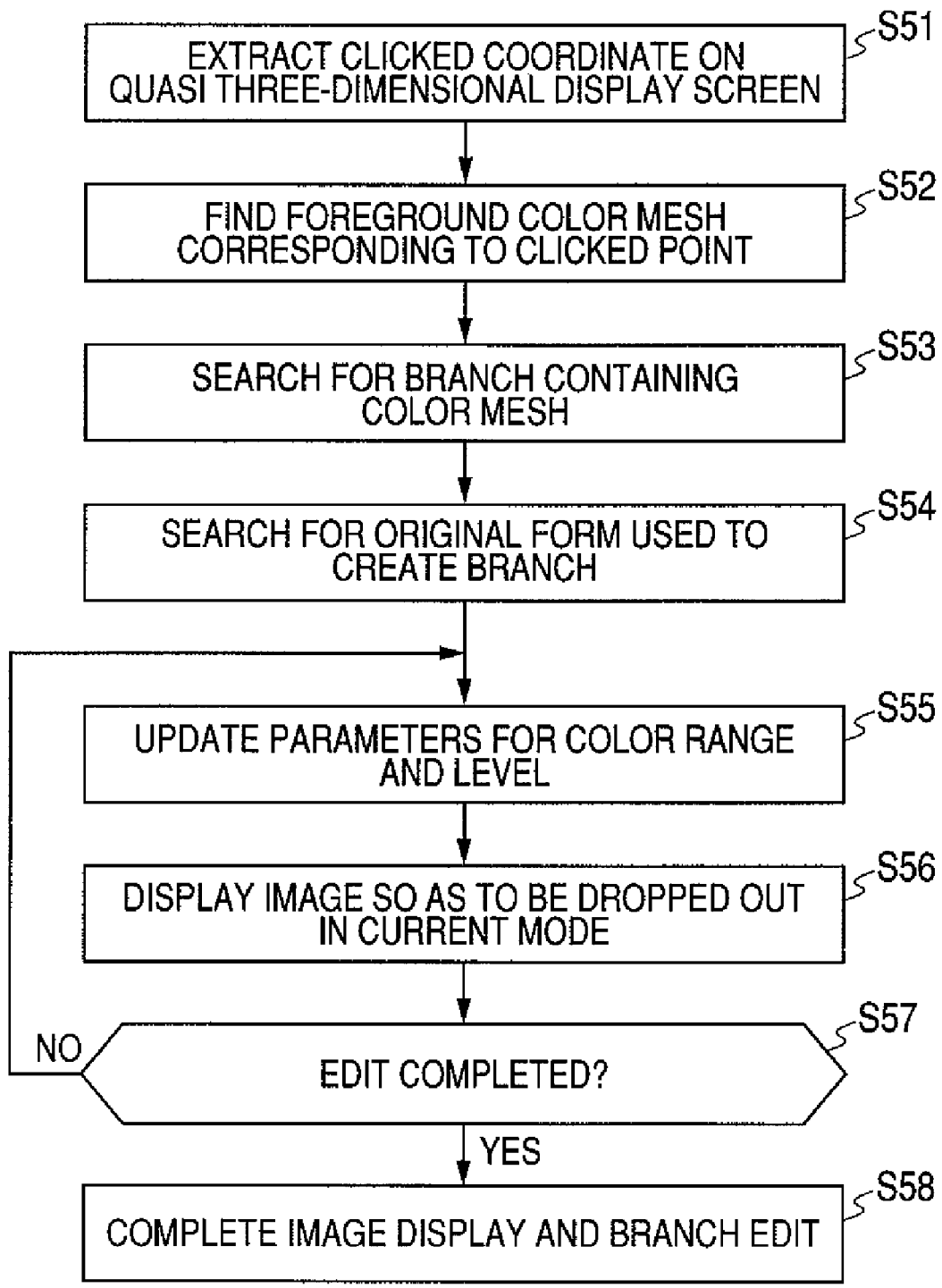
FIG. 18 is a flow chart of searching the histogram for an image.

FIG. 18 shows a flow chart of a process that searches the histogram for an image. The process extracts a coordinate clicked on the display screen (S51). The process finds the foreground mesh (S52). The process so far is the same as the branch extraction. The process then searches for a branch containing the mesh (S53). The process searches the branch management table for an original form used to create the branch (S54). The process displays an image corresponding to the form data that is dropped out in the current mode. The process updates parameters for the color range and the level (S55). The process updates the image (S56). When the editing is completed (S57), the process updates the stored data.

Figure 37:
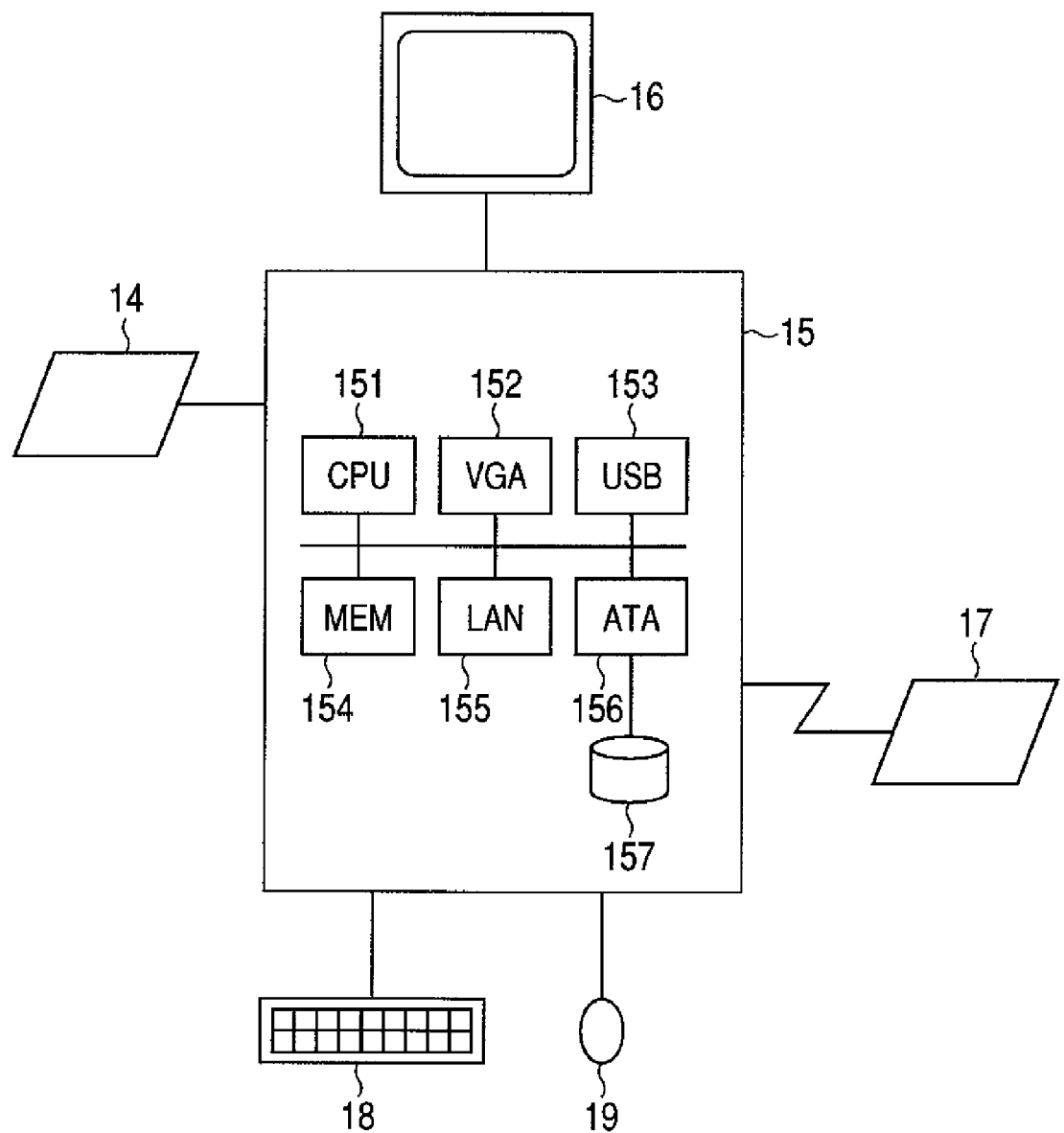
FIG. 37 is a block diagram showing hardware configuration according to the invention.

FIG. 37 shows a hardware configuration for embodying the invention. An image is input from a scanner 14. A personal computer 15 drop out the image. The image is transferred to a recognition apparatus 17.

The above-mentioned embodiment describes the form read apparatus as the main example. The invention can be easily applied to not only the form read apparatus but also image processing software or OCR software for personal computers.

The following describes the other embodiments of the invention in terms of configurations, example image displays, and process flow charts.

Second Embodiment

Figure 19:
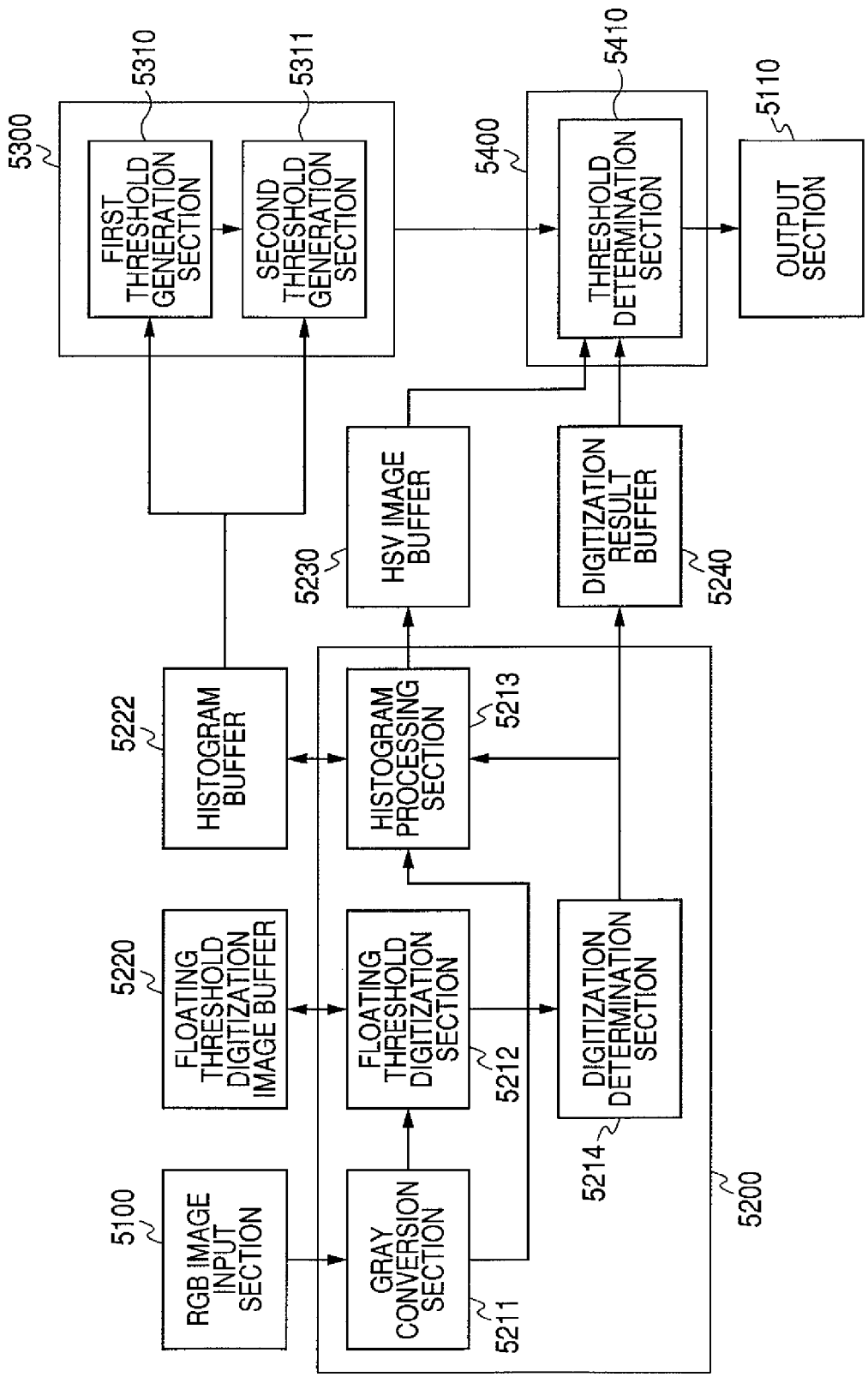
FIG. 19 is an overall block diagram showing a second embodiment of the invention.

FIG. 19 is an overall block diagram according to the second embodiment of the invention. An RGB image input section 5100 inputs an ROB image. A color space conversion and histogram creation section 5200 includes a gray conversion section 5211, a floating threshold digitization section 5212, and a digitization determination section 5214. These sections convert image data into an HSV color space and process histograms. A histogram processing section 5213 then collects a histogram of only black pixels recognized for digitization. A histogram buffer 5222 stores the histogram. A floating threshold digitization image buffer 5220 stores primary buffer data for digitization. An HSV image buffer 5230 stores images converted into HSV from RGB. A digitization result buffer 5240 stores digitization results.

An outline and threshold generation section 5300 includes a first threshold generation section 5310 and a second threshold generation section 5311. The outline and threshold generation section 5300 uses the sections 5310 and 5311 to generate threshold values for the ruled line region and the character region and define an extraction region in the color space. Based on the extraction region, a threshold determination section 5410 in a specified color conversion section 5400 determines whether or not a targeted pixel color belongs to the extraction region in the color space. An output section 5110 outputs an image to output devices such as a display and a printer.

Figure 20:
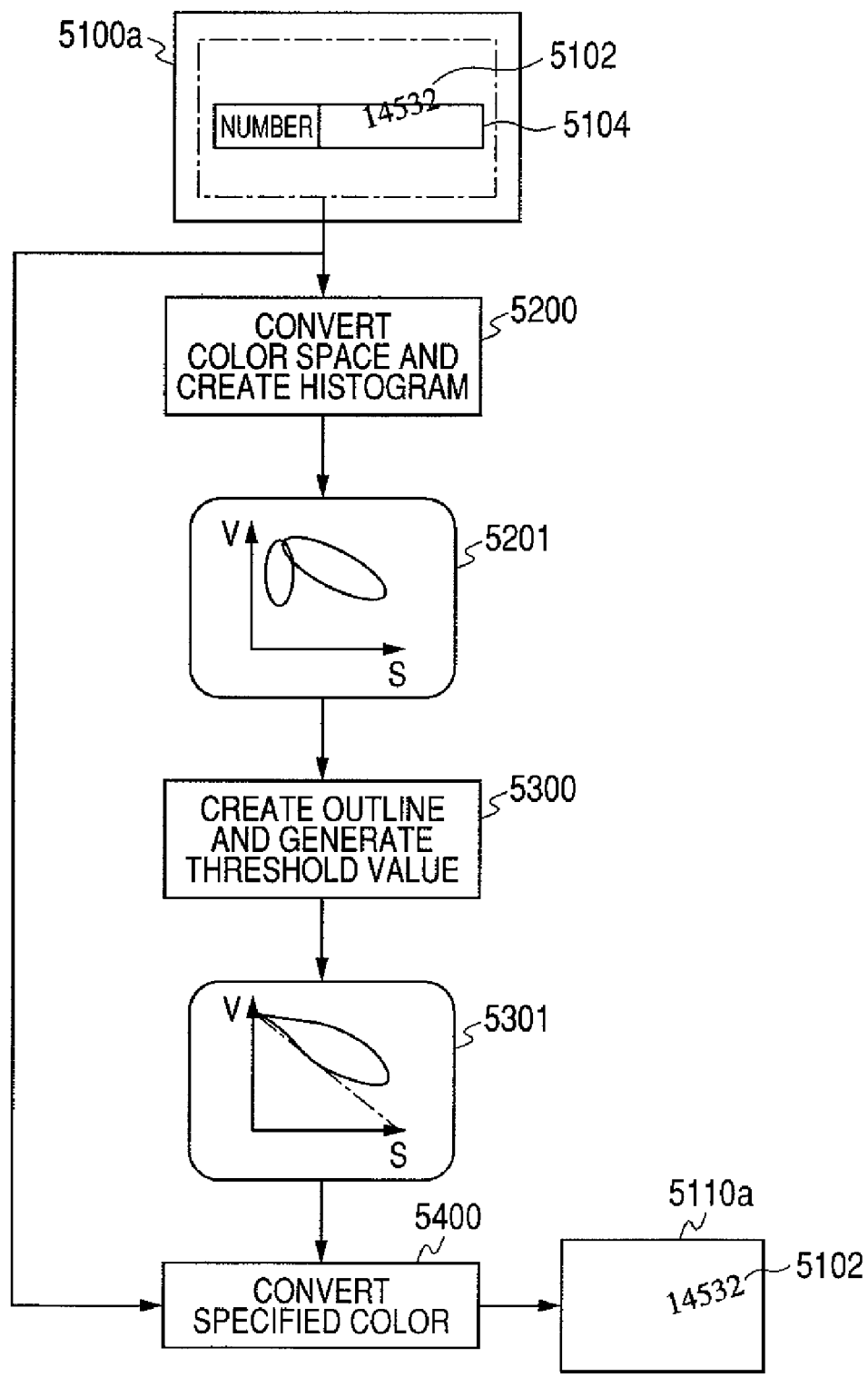
FIG. 20 is an overall flow chart according to the second embodiment of the invention.

FIG. 20 is an overall flow chart according to the second embodiment of the invention. An input image 5100a represents a form image where a ruled line 5104 is printed and a number 5102 is written. The color space conversion and histogram creation section 5200 electronically reads the form and converts it into multicolor image data such as ROB. The color space conversion and histogram creation section 5200 further converts the image data into an HSV color space and collects a corresponding histogram 5201. The HSV color space approaches to characteristics of human eyes.

The outline and threshold generation section 5300 further creates a frequency distribution outline from the histogram 5201. The outline and threshold generation section 5300 checks for interference between the created outline and a predetermined region or another outline and generates a threshold value 5301 on an SV plane. The specified color conversion section 5400 converts the image for the input image data based on the threshold value 5301. The specified color conversion section 5400 then replaces the ruled line 5104 with white to remove it and outputs an image 5110a that represents only the number 5102.

The above-mentioned processes will be described in detail. FIGS. 21A and 21B are schematic diagrams showing the HSV color space. FIG. 21A shows an HSV color space 2000 where the rotational direction denotes hue H; the radial direction denotes saturation S; and the height direction denotes value V. Compared to multicolor data such as RGB, the HSV color space is separated into hue, saturation and value and is capable of processes more approximate to human recognition. The embodiment classifies the hue into 30 types and the saturation and the value each into 32 types so as to find frequencies of image data converted into an HSV color space. FIG. 21B shows a schematic diagram for finding distribution of frequencies from the histogram. Frequencies of characters in black ink, for example, belong to a lowly saturated distribution 2002. Frequencies of colored ruled lines belong to highly saturated distributions 2003 and 2004.

FIG. 22 is a schematic diagram showing a histogram collection data structure of image data in the HSV color space. Collection data 2100 through 2104 are used to find frequencies of saturations (S) and values (V) in accordance with hues (H). The histogram is stored as three-dimensional data.

Figure 23A:
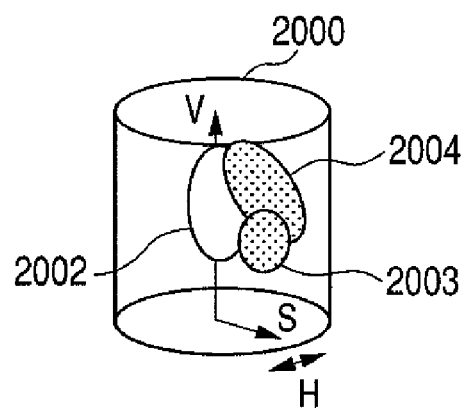
FIGS. 23A to 23D are schematic diagrams showing threshold value generation according to the second embodiment of the invention.
Figure 23B:
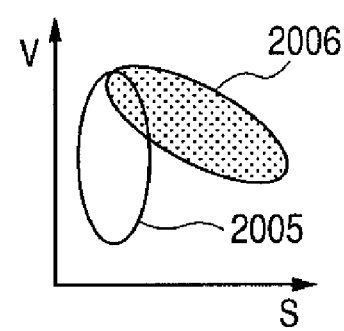
Figure 23C:
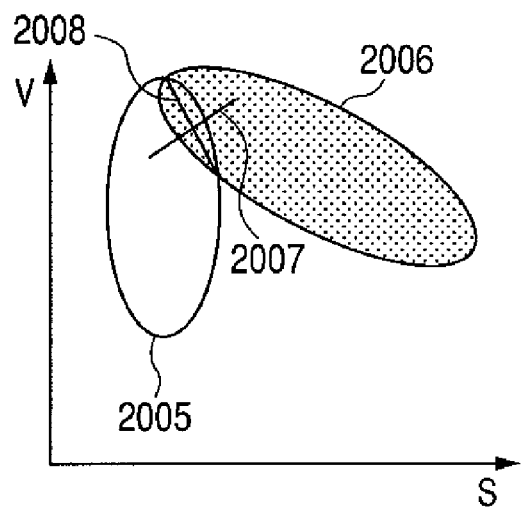
Figure 23D:
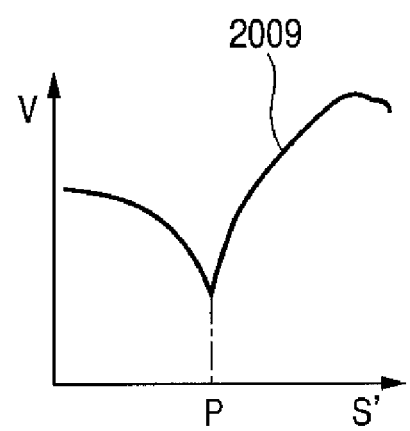

FIGS. 23A to 23D are schematic diagrams illustrating a threshold generation technique. FIG. 23A shows a histogram of the HSV color space 2000. FIG. 23B shows an S-V plane for one hue extracted from the HSV color space 2000. In the drawings, the abscissa axis represents saturation (S) and the ordinate axis represents value (V). Reference numeral 2005 represents distribution of characters. Reference numeral 2006 represents distribution of ruled lines. FIG. 23C is an enlargement of FIG. 23B. The distributions 2005 and 2006 often overlap with each other because of characters on ruled lines. Across section 2007 of the overlapping distribution often includes a trough formed in the frequency distribution as shown in FIG. 23D. FIG. 23C shows a trough line 2008. The second embodiment of the invention uses the frequency trough to separate the overlapping distribution of characters and ruled lines.

Figure 24A:
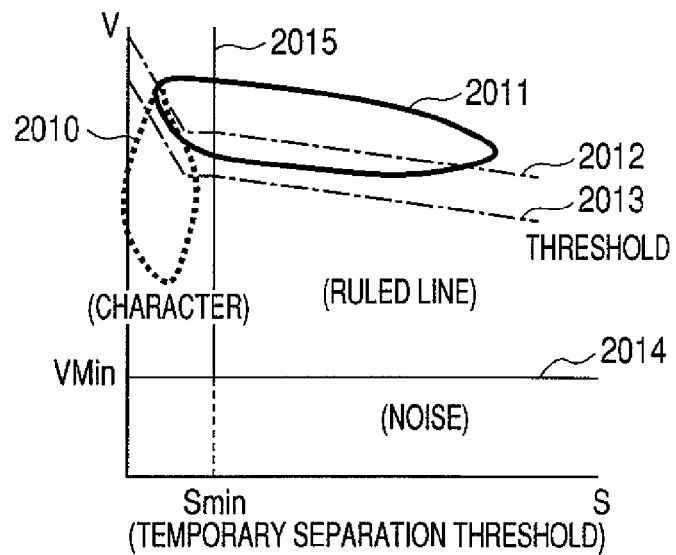
FIGS. 24A and 24B are detailed explanatory diagrams showing a threshold generation technique according to the second embodiment of the invention.
Figure 24B:
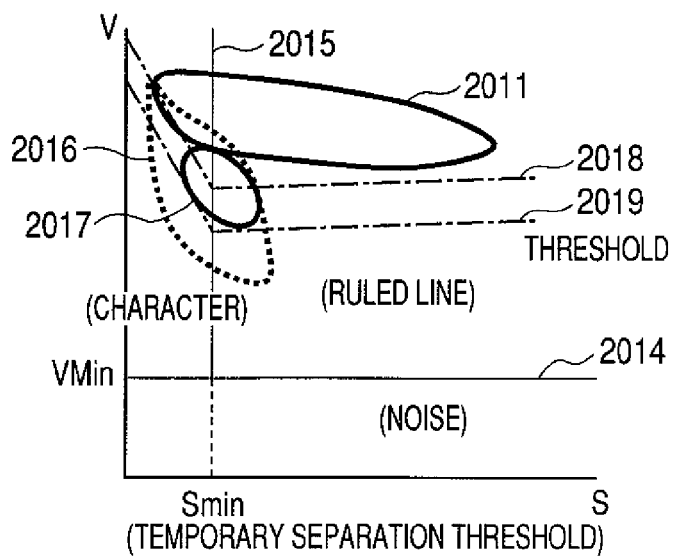

FIGS. 24A and 24B show an example threshold generation process and provide explanatory diagrams showing distributions of characters and ruled lines on the S-V plane corresponding to a specific hue H. In FIG. 24A, abscissa axis S is provided with temporary separation threshold Smin (line 2015) between a character 2010 and a ruled line 2011. The process finds a threshold approximation line 2012 from a histogram with the saturation larger than SMin. The process then finds an intersecting point between the approximation line and line S=SMin. To calculate an actual threshold value, a first threshold generation technique is used for histograms with a saturation greater than SMin. A second threshold generation technique is used for histograms with a saturation smaller than SMin. These algorithm will be described later in detail.

The threshold approximation line calculated above and the trough line form a polygonal line. The polygonal line is multiplied by a given correction coefficient to generate threshold value 2013 for color separation. VMin on ordinate axis V indicates an upper bound of noise. The threshold calculation is applicable to only values greater than or equal to VMin.

When the frequency distribution of characters is smaller than temporary separation threshold SMin, the character can be correctly separated from the ruled line as mentioned above. When character distribution 2016 is greater than temporary separation threshold SMin as shown in FIG. 24B, an error occurs between the threshold approximation line 2018 and the actual distribution to decrease a threshold value. Character distribution 2017 occurs above the threshold value, causing a read character to become faint and patchy.

Figure 25A:
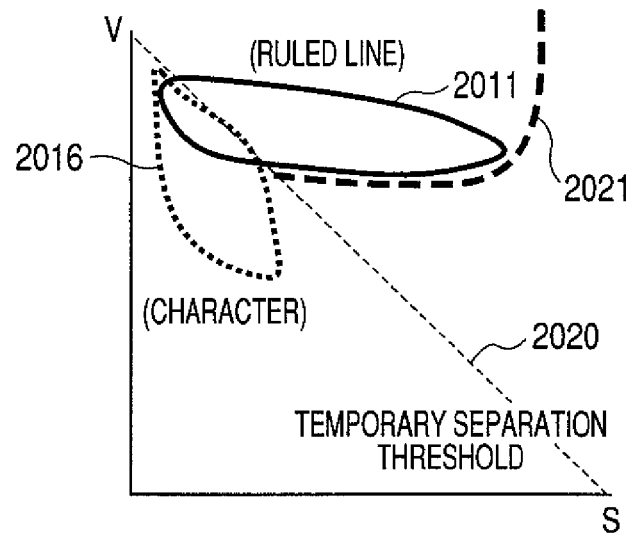
FIGS. 25A and 25B are detailed explanatory diagrams showing a modification of the threshold generation technique according to the second embodiment of the invention.
Figure 25B:
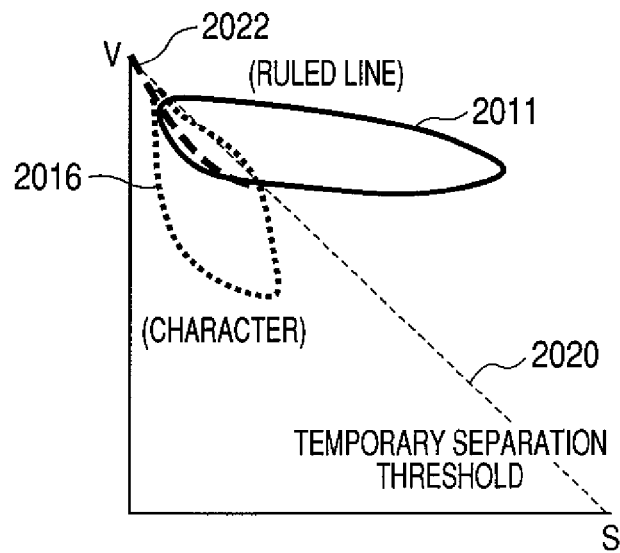

FIG. 25A shows another technique of setting a temporary separation threshold equivalent to the one mentioned above. A temporary separation threshold 2020 slopes approximately 45 degrees against the S axis. It is possible to reduce a difference between the temporary separation threshold and the actual distribution and reliably generate threshold values. The process finds a minimum boundary 2021 instead of linear approximation in a region with the saturation greater than the temporary separation threshold. It is possible to eliminate the correction coefficient used for conversion from the threshold approximation line into a threshold value and decrease the number of parameters. FIG. 25B shows a technique of determining a threshold value for a region smaller than the temporary separation threshold 2020. The technique finds a trough between the frequencies of characters and ruled lines.

Figure 26:
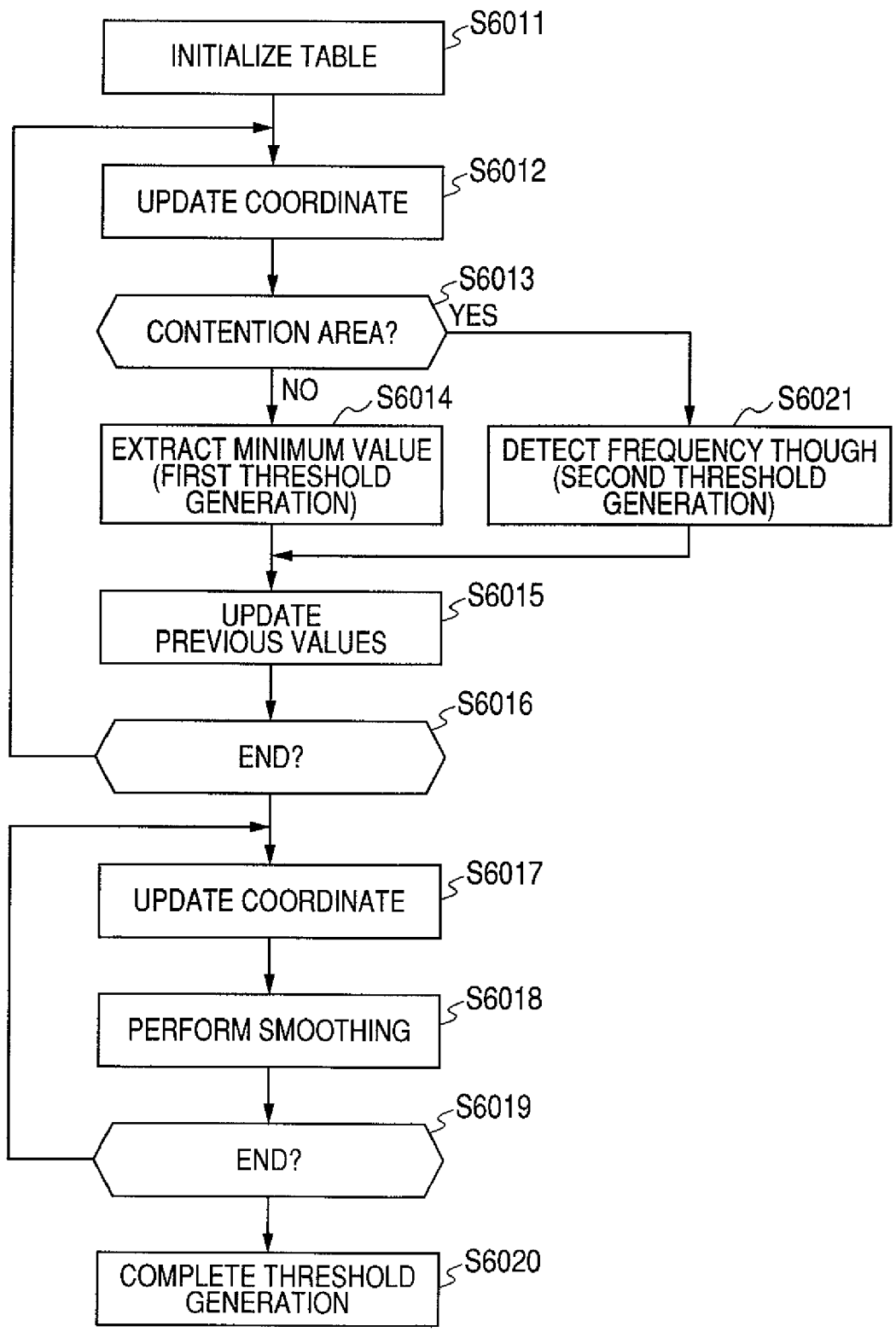
FIG. 26 is a flow chart showing threshold generation according to the second embodiment of the invention.

FIG. 26 shows an overall flow chart of the threshold generation process according to the second embodiment of the invention. The process initializes variables and the table (S6011) and updates coordinates (S6012). To move through the coordinates, the process scans color frequencies in the descending order of saturations S and in the ascending order of values V from the upper bound VMin for noise. When the coordinate is outside the contention area or the saturation is higher than the temporary separation threshold (S6013) as shown in FIGS. 24 and 25, the process finds a boundary by extracting a minimum value (S6014) according to the first threshold generation technique. When the saturation is lower than the temporary separation threshold (S6013), the process finds a boundary by extracting a frequency trough (S6021) according to the second threshold generation technique. After calculating the boundary, the process updates previous values to store the previous V position (S6015).

When the scan ends (S6016), the process proceeds to the next step. When the scan operation remains, the process returns to the coordinate update (S6012). The process updates the coordinate in the descending order of saturations S. When the scan ends (S6016), the process updates the coordinate in the ascending order of saturations S (S6017). The process performs a smoothing process to convert a sudden change into smooth movement (S6018). When the scan ends (S6019), the process completes the threshold generation (S6020).

Figure 27A:
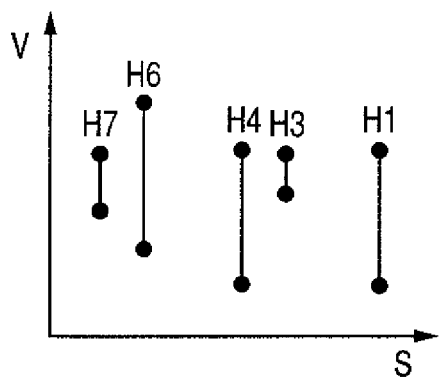
FIGS. 27A to 27D schematically show a first threshold generation technique according to the second embodiment of the invention.
Figure 27B:
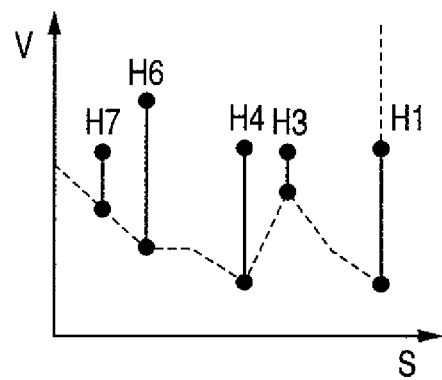

The following describes in detail the above mentioned two threshold generation techniques used for the second embodiment of the invention. FIGS. 27A to 27D are schematic diagrams that illustrate in detail a minimum value detection technology as the first threshold generation technique. FIG. 27A shows frequencies corresponding to hues H on the S-V plane. H1 through H7 indicate minimum and maximum values V corresponding to frequencies greater than a specified threshold value. The minimum and maximum values V are connected with lines. The frequency distribution depends on an image and is not found in all saturations S. FIG. 27A shows that H2 and H5 are missing. FIG. 27B shows how to find the minimum value V corresponding to the saturation S in the descending order of saturations S from the maximum saturation.

Figure 27C:
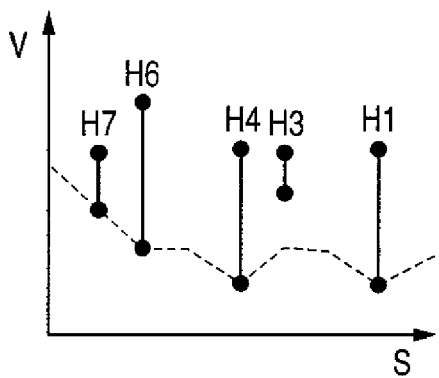
Figure 27D:
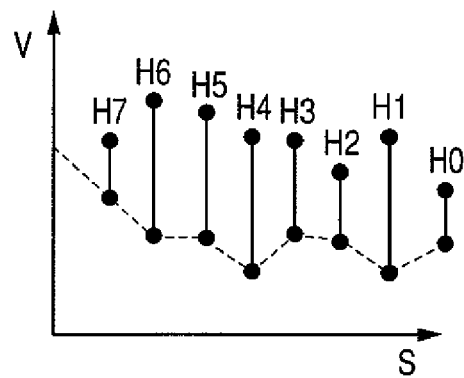
Figure 28:
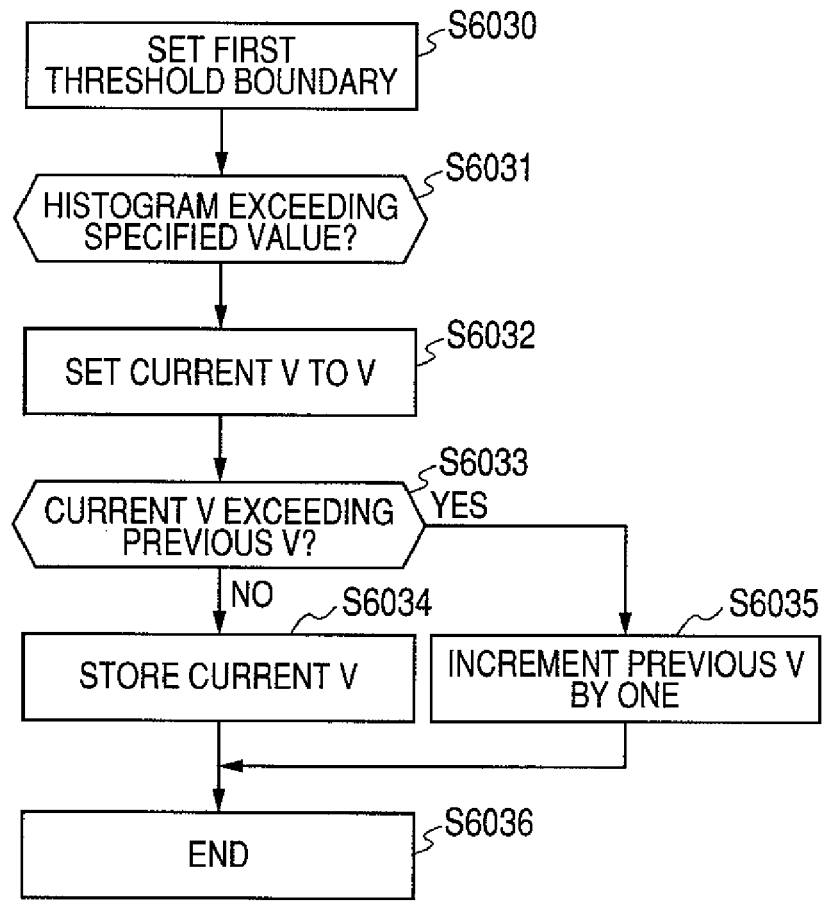
FIG. 28 is a flow chart showing the first threshold generation technique according to the second embodiment of the invention.

FIG. 28 shows a flow chart of this process. When the current minimum value (current V) is equal or smaller than a previously calculated minimum value (previous V) (S6033), the process uses the current value as is (S6034). When the current V is greater than the previous V (S6033) or no frequency is found, the process increments the previous V by 1 (S6035) and smoothes a sudden change (FIG. 27B). When this process terminates, then the saturation S is increased from 0 in the ascending order. When the current V is greater than the previous V, the process increments the previous V only by 1 to complete the smoothing process for both values (FIG. 27C,D). The smoothing process is performed in this manner to find an extraction region expected by the user from the frequencies acquired from the histogram.

Figure 29:
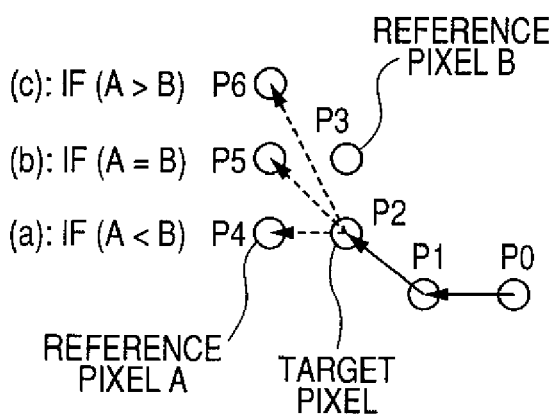
FIG. 29 schematically shows a second threshold generation technique according to the second embodiment of the invention.
Figure 30:
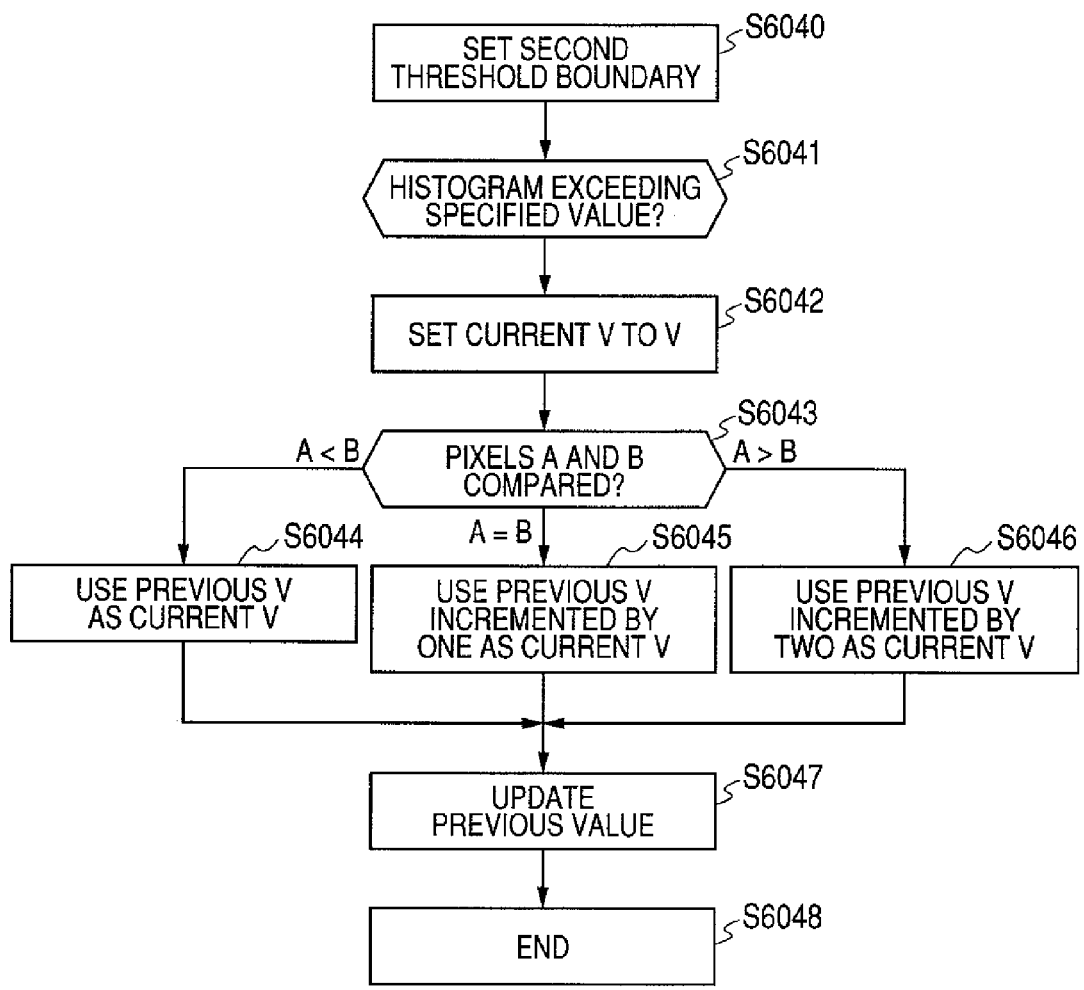
FIG. 30 is a flow chart showing the second threshold generation technique according to the second embodiment of the invention.

FIG. 29 is a schematic diagram that illustrates in detail a trough detection technology as the second threshold generation technique. The horizontal direction represents saturation S. The vertical direction represents value V. P0, P1, and P2 represent a process of determining saturations S in the ascending order. It is necessary to select one of P4, P5, and P6 when the next threshold boundary is found from P2. FIG. 30 shows a flow chart of this process. The process compares frequencies of reference pixels A and B (S6043). The process proceeds to P4 when the frequency of A is smaller than that of B (S6044). The process proceeds to P5 when the frequency of A is equal to that of B (S6045). The process proceeds to P6 when the frequency of A is greater than that of B (S6046). The process can follow troughs of frequencies to determine a threshold value.

Third Embodiment

The third embodiment of the invention will be described. The second embodiment uses a temporary separation threshold in the color space so as to extract a character that is written on a colored ruled line and approximates to an achromatic color such as black. The third embodiment aims at extracting a character written in chromatic color with a color ballpoint pen, marker pen, or carbon paper. For this purpose, the third embodiment can perform the threshold generation process like the second embodiment using an area free of extracted color as the temporary separation threshold.

Figure 31:
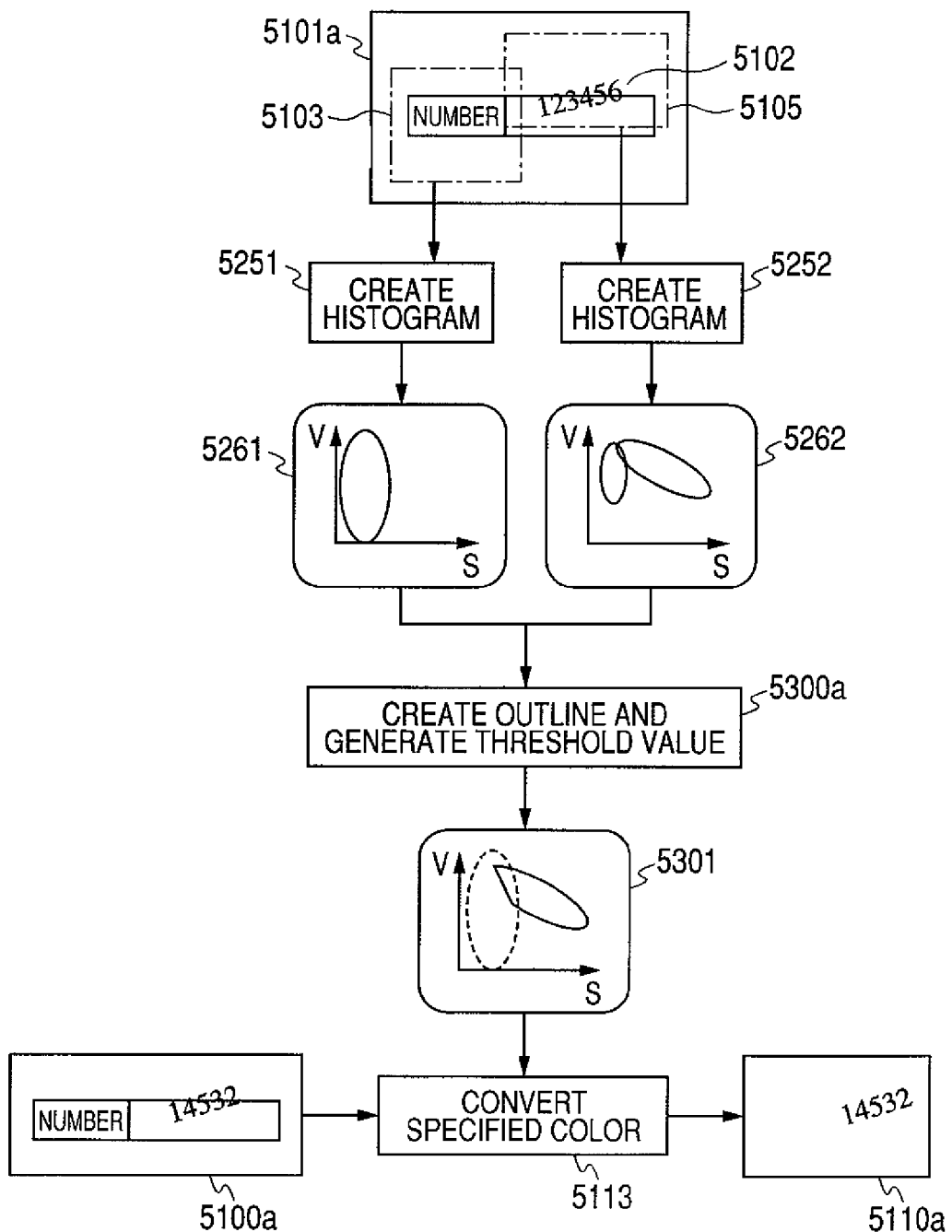
FIG. 31 is an overall flow chart according to a third embodiment of the invention.

FIG. 31 shows an overall flow chart illustrating the third embodiment. A reference image needs to be used to define a color to be extracted. A reference image 5101a contains a character as an extracted color 5102 and a ruled line not to be extracted. A first range specification section specifies an extracted-color-inclusive range 5105. A second range specification section specifies an extracted-color-exclusive range 5103. The system automatically determines a color to be extracted. There is no need to finely specify one dot in a character to be extracted as conventionally practiced. It is unnecessary to supply a marginal threshold value for the extracted center color.

Histogram creation sections 5251 and 5252 create histograms for the extracted-color-exclusive range 5103 and the extracted-color-inclusive range 5105. The histogram creation section 5251 creates a histogram 5261 excluding an extracted color. The histogram creation section 5252 creates a histogram 5262 including an extracted color. An outline and threshold generation section 5300a generates a character extraction threshold 5301 from the histograms. The outline and threshold generation section 5300a detects an "extracted color" when image data is located inside an extracted-color-inclusive enveloping surface and outside an extracted-color-exclusive enveloping surface. The threshold value is used as a basis for determining whether or not the HSV values for pixels of the input image 5100 are located within the extraction boundary in the color space. And the extracted color is converted into a specified color to perform the dropout process.

Figure 32A:
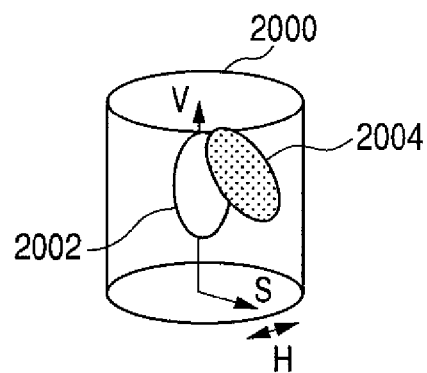
FIGS. 32A to 32F are schematic diagrams showing threshold value generation according to the third embodiment of the invention.
Figure 32B:
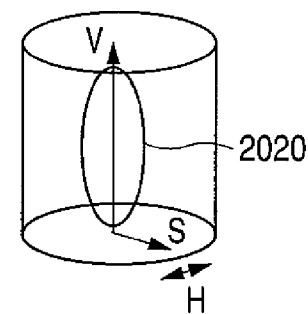
Figure 32C:
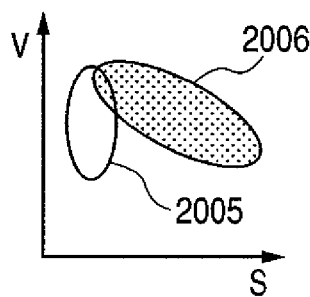
Figure 32D:
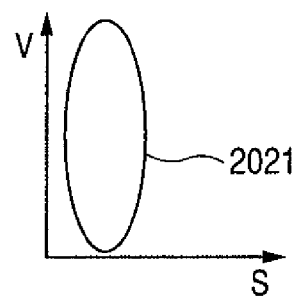
Figure 32E:
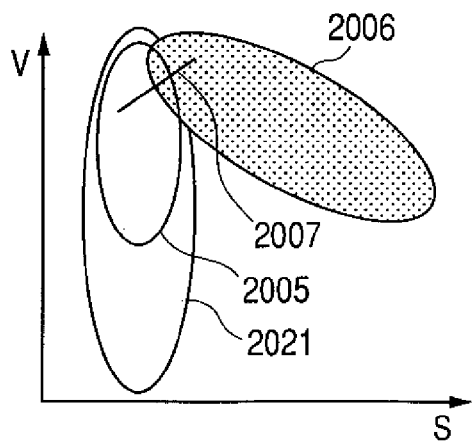
Figure 32F:
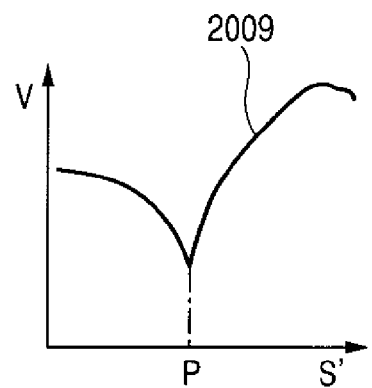

FIGS. 32A to 32F are schematic diagrams showing threshold value generation. FIG. 32A shows a histogram including an extracted color. FIG. 32B shows a histogram excluding an extracted color. FIGS. 32C and 32D are sectional views of FIGS. 32A and 32B taken along a given hue H. The second embodiment previously defines a temporary separation threshold in the color space. The third embodiment can perform the threshold generation process like the second embodiment using an area free of extracted color as a temporary separation threshold 2021. When a pixel is located outside the temporary separation threshold 2021 in FIG. 32E, the system generates a threshold value using the minimum value detection technology as the first threshold generation technique mentioned above. When the pixel is located inside the temporary separation threshold 2021, the system generates a threshold value using a trough detection technology as the second threshold generation technique. FIG. 32F is a schematic diagram showing a frequency trough at a cross section 2007 in FIG. 32E.

Figure 33A:
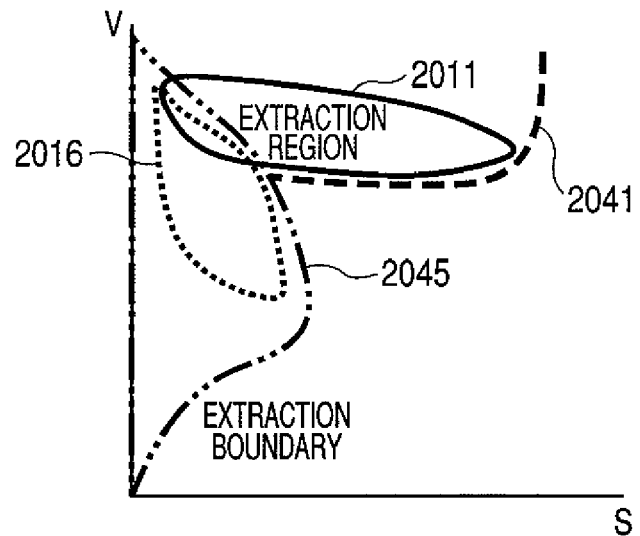
FIGS. 33A and 33B are explanatory diagrams showing threshold value generation according to the third embodiment of the invention.
Figure 33B:
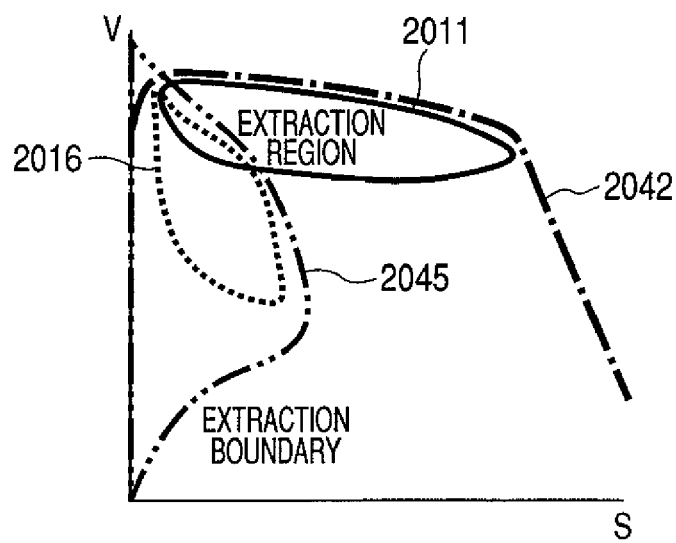

FIGS. 33A and 33B are schematic diagrams illustrating the threshold generation technique according to the embodiment. Reference numeral 2011 denotes ruled line distribution. Reference numeral 2016 denotes character distribution. The technique performs a process using a first smoothing means for generating an extracted-color-inclusive enveloping surface. FIG. 33A is a schematic diagram showing detection of a minimum value 2041 outside an area 2045 excluding an extracted color. The technique detects the minimum value in the extraction region by means of smoothing in the descending order of saturations S. FIG. 33B is a schematic diagram showing detection of a maximum value 2042 outside the area 2045 excluding the extracted color.

Figure 34A:
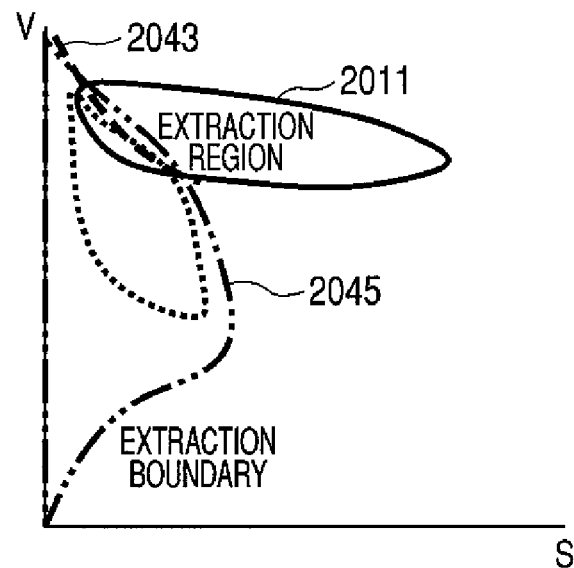
FIGS. 34A and 34B are other explanatory diagrams showing threshold value generation according to the third embodiment of the invention.
Figure 34B:
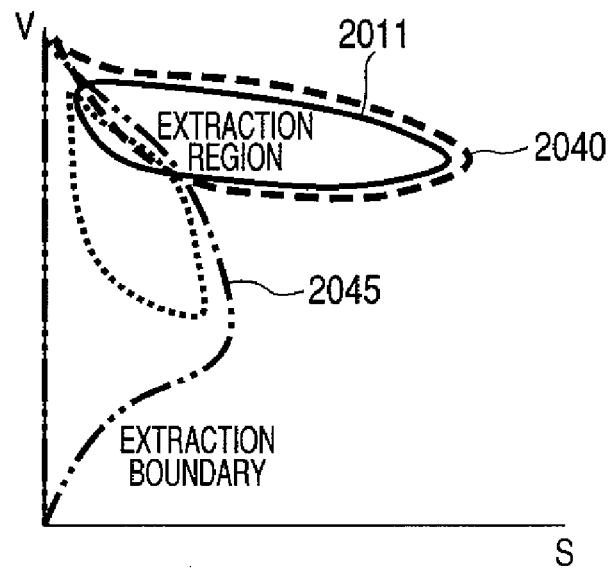

FIGS. 34A and 34B illustrate detection of a frequency trough line 2043 inside the area 2045 excluding the extracted color using a second smoothing means for generating an extracted-color-exclusive enveloping surface. Connecting detection results automatically provides an extraction region 2046 expected by the user as shown in FIG. 34B. A simple specification enables color extraction without needing to combine complex threshold values.

Figure 35:
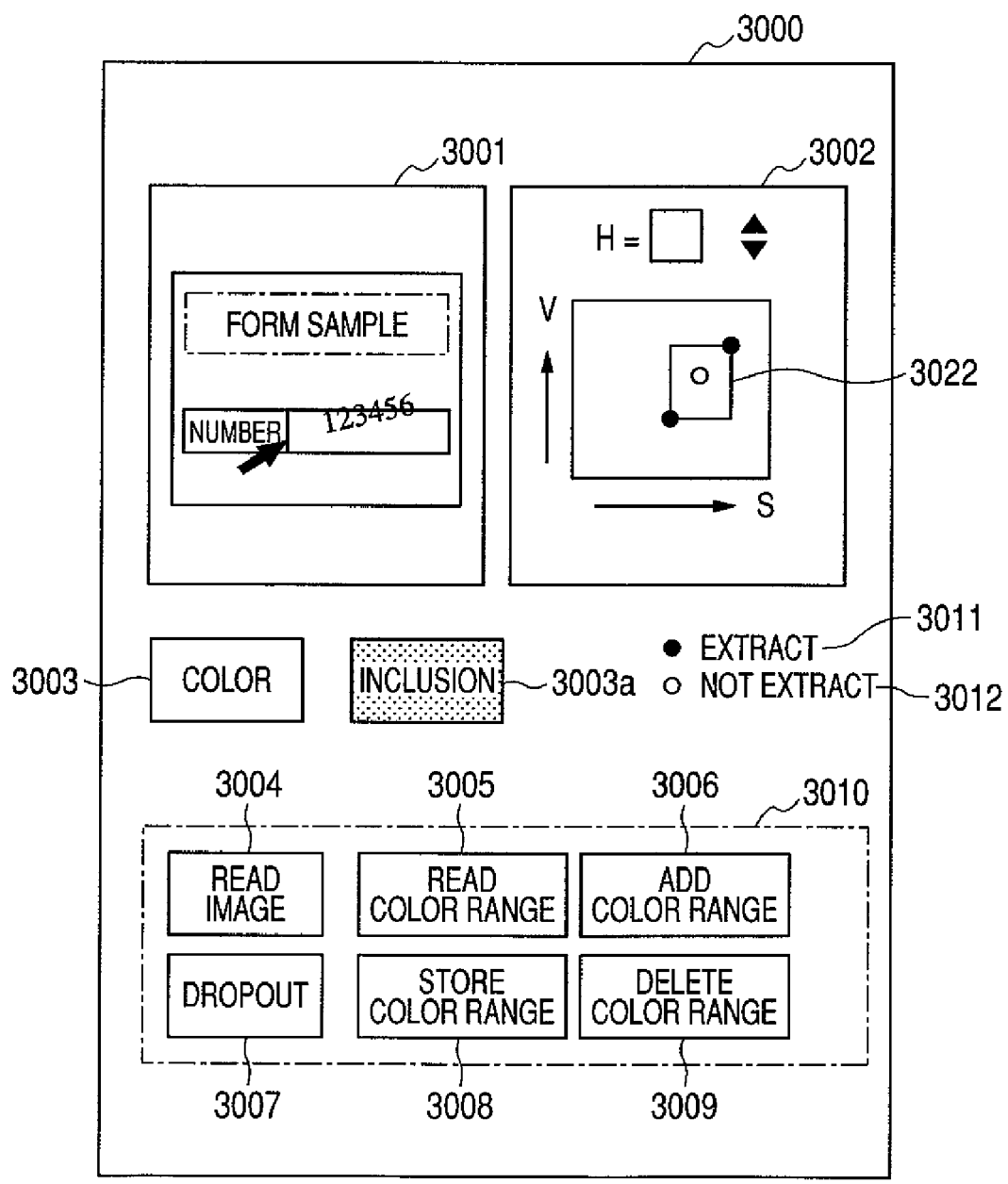
FIG. 35 is a schematic diagram showing an operation screen according to the embodiments of the invention.

FIG. 35 shows an example screen display according to the invention. A screen 3000 includes a screen preview 3001, a histogram display 3002, and edit buttons 3010. Turning on a color specification button 3003 provides a display in accordance with a conventional interface. The preview screen 3001 displays a read reference image. An extraction-enabling radio button 3011 or an extraction-disabling radio button 3012 is turned on to specify a pixel whether or not it is to be extracted.

When a pixel to be extracted or not is clicked on the preview screen 3001, a center color space is displayed in the color space on the histogram display 3002. A mouse can be used to adjust a bounding box 3022 and define a range. When an area to be extracted or not is settled, the area can be edited through the use of buttons such as store color range 3008, add color range 3006, and delete color range 3009.

Figure 36:
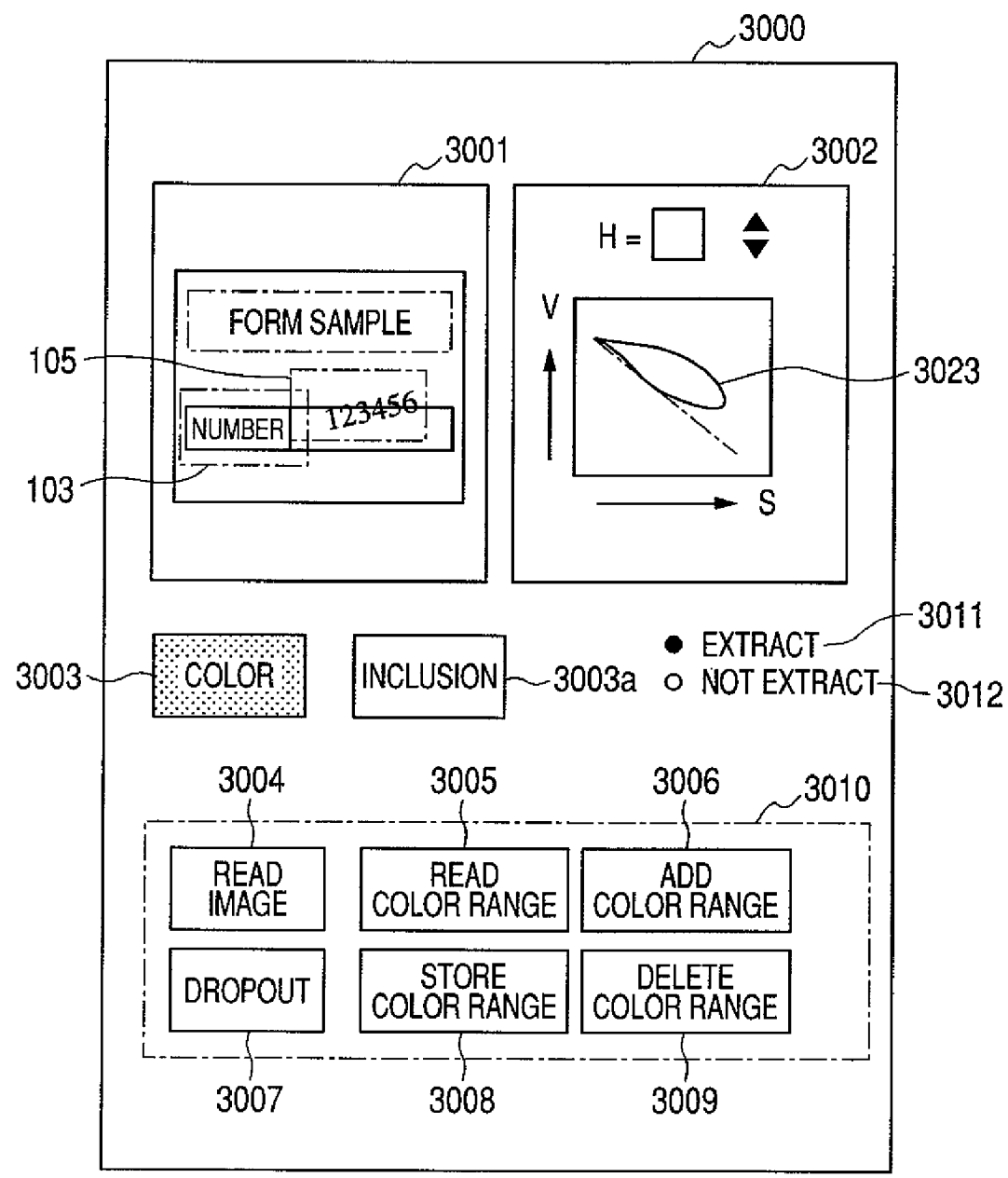
FIG. 36 is a schematic diagram showing another operation screen according to the embodiments of the invention.

FIG. 36 shows another example image display according to the invention. When an inclusion button 3003a is turned on, it is possible to specify an extracted-color-inclusive range 105 or an extracted-color-exclusive range 103 on the preview screen 3001. The display is useful when a small area contains a ruled line and a character or when a character needs to be specified on a halftone background. Similarly to the above-mentioned technique, the extraction-enabling radio button 3011 or the extraction-disabling radio button 3012 can be turned on or off to specify whether or not to include the extracted color.

FIG. 37 shows an example hardware configuration that embodies the invention. A color image is input from the scanner 14. The personal computer 15 extracts and processes the image and then transfers the image to the recognition apparatus 17. Reference numeral 151 denotes a CPU; 152 denotes an image control section; 153 denotes a USB connection section; 154 denotes memory, 155 denotes a LAN interface; 156 denotes an ATA interface; and 157 denotes a hard disk. A keyboard 18 or a mouse 19 is connected to the personal computer 15 and is used to specify a threshold value or a color range.

The invention can be easily applied to not only the form read apparatus but also image processing software or OCR software for personal computers.

The following describes the other embodiments available to the invention.

(Supplementary note 1) There is provided a dropout color processing apparatus including: an input section that inputs a document as multicolor image data; a color space conversion section that converts the image data into a specified color space; a histogram creation section that creates a histogram of data in the color space; an outline creation section that creates an outline of data distribution based on the histogram; a threshold generation section that generates a threshold value based on the created outline and creates an extraction region in a color space; a specified color conversion section that converts a pixel of the image data into specified color depending on whether or not a result of converting a pixel of the image data into the color space belongs to an extraction region in the color space; and an output section that outputs a processed image; a first range specification section that specifies an "extracted-color-inclusive" image area for the image data; a second range specification section that specifies an "extracted-color-exclusive" image area for the image data; a histogram creation section that extracts color space distribution in the "extracted-color-inclusive" image area and part or all of the "extracted-color-exclusive" image area; and a threshold generation section that generates a threshold value based on a result of the histogram extraction. A means for generating an "extracted color" determination criterion is provided to vary extraction degrees in a contention region inside an extracted-color-inclusive enveloping surface and inside an extracted-color-exclusive enveloping surface depending on a distance between boundary surface colors on the enveloping surface.

(Supplementary note 2) The dropout color processing apparatus according to supplementary note 1 uses a means for specifying an "extracted-color-inclusive" image region or an "extracted-color-exclusive" image region in the image data. The means includes: a means for providing an operator with input image data or digitized data equivalent an input image; a means for allowing an operator to select an "extracted-color-inclusive" image region or an "extracted-color-exclusive" image region; a means for changing the selection; a means for changing color of a rectangle displayed after a drag and specification in accordance with an "extracted-color-inclusive" or "extracted-color-exclusive" criterion; and a means for storing beginning and end positions of a specified image region.

(Supplementary note 3) The dropout color processing apparatus according to supplementary note 1 includes a means for displaying an "extracted color" determination criterion on a two-dimensional or three-dimensional frequency distribution image.

(Supplementary note 4) The dropout color processing apparatus according to supplementary note 3 includes: a means for displaying output image generated based on multiple "extracted color" determination criteria so that output images overlap with each other in different colors; a means for providing the output image with a color corresponding to a targeted image area and targeted output; a means for indicating a correct solution for an extracted location; a means for displaying correct solution data; and a means for storing correction solution data.

(Supplementary note 5) The dropout color processing apparatus according to supplementary note 4 includes: a means for editing such as adding new "extracted color" to or deleting "extracted color" from a predetermined "extracted color" determination criterion; and a means for displaying a difference between an editing result and output according to a determination criterion before editing.

(Supplementary note 6) The dropout color processing apparatus according to supplementary note 5 includes: a means for displaying a difference from correct solution data in addition to output images before and after editing an "extracted color" determination criterion.

(Supplementary note 7) There is provided a dropout color processing apparatus including: an input section that inputs a document as multicolor image data; a color space conversion section that converts the image data into a specified color space; a histogram creation section that creates a histogram of data in the color space; an outline creation section that creates an outline of data distribution based on the histogram; a threshold generation section that generates a threshold value based on the created outline and creates an extraction region in a color space; a specified color conversion section that converts a pixel of the image data into specified color depending on whether or not a result of converting a pixel of the image data into the color space belongs to an extraction region in the color space; an output section that displays or outputs a processed image; a first range specification section that specifies an "extracted-color-inclusive" image area for the image data; a second range specification section that specifies an "extracted-color-exclusive" image area for the image data; a histogram creation section that extracts color space distribution in the "extracted-color-inclusive" image area and part or all of the "extracted-color-exclusive" image area; and a threshold generation section that generates a threshold value based on a result of the histogram extraction. The dropout color processing apparatus includes a means for generating a threshold value for "extracted color." The means includes a first smoothing means, a second smoothing means, and a threshold generation section. The first smoothing means generates an extracted-color-inclusive enveloping surface as distribution in a color space where an "extracted-color-inclusive" image region is extracted. The second smoothing means generates an extracted-color-exclusive enveloping surface as distribution in a color space where an "extracted-color-exclusive" image region is extracted. The threshold generation section has a criterion of assuming an "extracted color" to be located at least inside an extracted-color-inclusive enveloping surface and outside an extracted-color-exclusive enveloping surface. The dropout color processing apparatus further includes a means for generating an enveloping surface. The means detects minimum and maximum values for each hue and saturation and performs smoothing in saturation and hue directions.

(Supplementary note 8) There is provided a dropout color processing apparatus including: an input section that inputs a document as multicolor image data; a color space conversion section that converts the image data into a specified color space; a histogram creation section that creates a histogram of data in the color space; an outline creation section that creates an outline of data distribution based on the histogram, a threshold generation section that generates a threshold value based on the created outline and creates an extraction region in a color space; a specified color conversion section that converts a pixel of the image data into specified color depending on whether or not a result of converting a pixel of the image data into the color space belongs to an extraction region in the color space; an output section that displays or outputs a processed image; a first range specification section that specifies an "extracted-color-inclusive" image area for the image data; a second range specification section that specifies an "extracted-color-exclusive" image area for the image data; a histogram creation section that extracts color space distribution in the "extracted-color-inclusive" image area and part or all of the "extracted-color-exclusive" image area; and a threshold generation section that generates a threshold value based on a result of the histogram extraction. The dropout color processing apparatus includes a means for generating a threshold value for "extracted color." The means includes a first smoothing means, a second smoothing means, and a threshold generation section. The first smoothing means generates an extracted-color-inclusive enveloping surface as distribution in a color space where an "extracted-color-inclusive" image region is extracted. The second smoothing means generates an extracted-color-exclusive enveloping surface as distribution in a color space where an "extracted-color-exclusive" image region is extracted. The threshold generation section has a criterion of assuming an "extracted color" to be located at least inside an extracted-color-inclusive enveloping surface and outside an extracted-color-exclusive enveloping surface. The dropout color processing apparatus further includes a means for generating an enveloping surface. The means detects minimum and maximum saturations for each hue and value and performs smoothing in value and hue directions.

What is claimed is:

1. A dropout color processing apparatus comprising:
   an input section that inputs a document as multicolor image data;
   a color space conversion section that converts the image data into a specified color space;
   a histogram creation section that creates a histogram of data in the color space;
   an outline creation section that creates an outline of data distribution based on the histogram;
   a threshold generation section that creates a threshold value based on the created outline and creates an extraction region in a color space;
   a specified color conversion section that converts a pixel of the image data into specified color depending on whether or not a result of converting a pixel of the image data into the color space belongs to an extraction region in the color space;
   an output section that outputs a processed image;
   a first range specification section that specifies an "extracted-color-inclusive" image area for the image data;
   a second range specification section that specifies an "extracted-color-exclusive" image area for the image data;
   a histogram creation section that extracts color space distribution in the "extracted-color-inclusive" image area and part or all of the "extracted-color-exclusive" image area;
   a threshold generation section that generates a threshold value based on a result of the histogram extraction;
   wherein the means includes a first smoothing means, a second smoothing means, and a threshold generation section;
   wherein the first smoothing means generates an extracted-color-inclusive enveloping surface as distribution in a color space where an extracted-color-inclusive image region is extracted;
   wherein the second smoothing means generates an extracted-color-exclusive enveloping surface as distribution in a color space where an extracted-color-exclusive image region is extracted; and
   wherein the threshold generation section has a criterion of assuming an extracted color to be located at least inside an extracted-color-inclusive enveloping surface and outside an extracted-color-exclusive enveloping surface.

2. A dropout color processing method comprising the steps of:
   inputting a document as multicolor image data;
   converting the image data into a specified color space;
   creating a histogram of data in the color space;
   creating an outline of data distribution based on the histogram;
   creating a threshold value based on the created outline and creating an extraction region in a color space;
   converting a pixel of the image data into specified color depending on whether or not a result of converting a pixel of the image data into the color space belongs to an extraction region in the color space;
   outputting a processed image;
   specifying an "extracted-color-inclusive" image area and an "extracted-color-exclusive" image area for the image data;
   extracting color space distribution in the "extracted-color-inclusive" image area and part or all of the "extracted-color-exclusive" image area to create histograms; and
   generating a threshold value based on a result of the histogram extraction;
   wherein generating a threshold value for extracted color includes:
      generating an extracted-color-inclusive enveloping surface as distribution in a color space where an extracted-color-inclusive image region is extracted;
      generating an extracted-color-exclusive enveloping surface as distribution in a color space where an extracted-color-exclusive image region is extracted; and
      assuming an extracted color to be located at least inside an extracted-color-inclusive enveloping surface and outside an extracted-color-exclusive enveloping surface.

* * * * *